(12) United States Patent
Latta et al.

(10) Patent No.: US 9,146,398 B2
(45) Date of Patent: Sep. 29, 2015

(54) PROVIDING ELECTRONIC COMMUNICATIONS IN A PHYSICAL WORLD

(75) Inventors: Stephen G. Latta, Seattle, WA (US);
Sheridan Martin Small, Seattle, WA (US); James C. Liu, Bellevue, WA (US);
Benjamin I. Vaught, Seattle, WA (US);
Darren Bennett, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 563 days.

(21) Appl. No.: 13/181,156

(22) Filed: Jul. 12, 2011

(65) Prior Publication Data

US 2013/0016033 A1    Jan. 17, 2013

(51) Int. Cl.
| | | |
|---|---|---|
| *G02B 27/01* | (2006.01) | |
| *G06F 3/01* | (2006.01) | |
| *G06F 3/03* | (2006.01) | |
| *G06F 3/147* | (2006.01) | |

(52) U.S. Cl.
CPC .............. *G02B 27/017* (2013.01); *G06F 3/011* (2013.01); *G06F 3/013* (2013.01); *G06F 3/017* (2013.01); *G06F 3/0304* (2013.01); *G02B 2027/014* (2013.01); *G02B 2027/0178* (2013.01); *G06F 3/147* (2013.01)

(58) Field of Classification Search
CPC ..... G02B 27/01; G02B 27/017; G06F 3/0425
USPC ........................................................ 345/7, 8
See application file for complete search history.

(56) References Cited

U.S. PATENT DOCUMENTS

| | | | |
|---|---|---|---|
| 6,771,294 B1 * | 8/2004 | Pulli et al. ..................... | 715/863 |
| 7,812,815 B2 | 10/2010 | Banerjee et al. | |

(Continued)

FOREIGN PATENT DOCUMENTS

| | | |
|---|---|---|
| EP | 2328112 A1 | 6/2011 |
| JP | 10-020997 A | 1/1998 |

(Continued)

OTHER PUBLICATIONS

Billinghurst et al., "Collaborative Augmented Reality", Communications of the ACM—How the virtual inspires the real, Jul. 2002, vol. 45, Issue 7, pp. 64-70, ACM New York, NY, USA, 8 pages.

(Continued)

*Primary Examiner* — Gerald Johnson
*Assistant Examiner* — Christopher Kohlman
(74) *Attorney, Agent, or Firm* — Dan Choi; Judy Yee; Micky Minhas

(57) ABSTRACT

Techniques are provided for displaying electronic communications using a head mounted display (HMD). Each electronic communication may be displayed to represent a physical object that indentifies it as a specific type or nature of electronic communication. Therefore, the user is able to process the electronic communications more efficiently. In some aspects, computer vision allows a user to interact with the representation of the physical objects. One embodiment includes accessing electronic communications, and determining physical objects that are representative of at least a subset of the electronic communications. A head mounted display (HMD) is instructed how to display a representation of the physical objects in this embodiment.

20 Claims, 14 Drawing Sheets

(56) References Cited

U.S. PATENT DOCUMENTS

| | | | |
|---|---|---|---|
| 2002/0140744 A1* | 10/2002 | Kanevsky et al. | 345/839 |
| 2004/0172455 A1* | 9/2004 | Green et al. | 709/207 |
| 2004/0189702 A1 | 9/2004 | Hlavac et al. | |
| 2007/0161382 A1* | 7/2007 | Melinger et al. | 455/456.1 |
| 2011/0205243 A1* | 8/2011 | Matsuda | 345/633 |
| 2013/0127980 A1* | 5/2013 | Haddick et al. | 348/14.08 |

FOREIGN PATENT DOCUMENTS

| | | |
|---|---|---|
| JP | 2005-086328 A | 3/2005 |
| JP | 2008-059510 A | 3/2008 |

OTHER PUBLICATIONS

Gelb et al., "Augmented Reality for Immersive Remote Collaboration", Proceedings of the 2011 IEEE Workshop on Person-Oriented Vision (POV), Jan. 7, 2011, Kona, HI, USA, 6 pages.

Hirakawa et al., "A Collaborative Augmented Reality System using Transparent Display", Proceedings of the Sixth International Symposium on Multimedia Software Engineering (ISME'04), Dec. 13-15, 2004, IEEE Computer Society, Washington, DC, USA, 7 pages.

Mourkoussis et al., "Using XML Technologies to Present Digital Content with Augmented Reality", Proceedings of the 5th Eurographics Ireland Chapter Workshop, Eurographics Ireland Workshop Series, vol. 3, Eds.: D. Murphy and J.O'Mullane, Sep. 9, 2004, Cork, Ireland, 8 pages.

Rekimoto et al., "Augment-able Reality: Situated Communication through Physical and Digital Spaces", Proceedings of the Second International Symposium on Wearable Computers, pp. 68-75, Oct. 19-20, 1998, IEEE Computer Society, Washington, DC, USA, 8 pages.

Starner et al., "Augmented Reality Through Wearable Computing", Teleoperators and Virtual Environments-Presence, Aug. 1997, vol. 6, issue 4, pp. 386-398, MIT Presse, Cambridge, MA, USA, 24 pages.

Trux, Jon, "SixthSense—the wearable computer", Science Photo Library, 2009 [retrieved on May 5, 2011], Retrieved from the Internet: <URL:http://www.casadaimagem.com/pdf_t/Tematicas/SPL/PDF/1248-SixthSensetheWearableComputer.pdf>, 2 pages.

Ullmer et al., "Emerging frameworks for tangible user interfaces", IBM Systems Journal, vol. 39, Issue 3-4, Jul. 2000, pp. 915-931. IBM Corporation, Riverton, NJ, USA, 17 pages.

International Search Report and Written Opinion of the International Searching Authority dated Dec. 20, 2012, PCT Application No. PCT/US2012/046554 filed Jul. 12, 2012, 10 pages.

English Abstract of Foreign Patent Document JP10-020997, published Jan. 23, 1998, Applicant Canon Inc, 2 pages.

English Abstract of Foreign Patent Document JP2005-086328, published Mar. 31, 2005, Applicant Fuji Photo Film Co Ltd, 2 pages.

English Abstract of Foreign Patent Document JP2008-05951, published Mar. 13, 2008, Applicant Brother IND Ltd, 1 page.

\* cited by examiner

PROVIDING ELECTRONIC COMMUNICATIONS IN A PHYSICAL WORLD

BACKGROUND

Users today are inundated with electronic communications from a wide variety of sources. For example, users receive electronic mail, text messages, social network feeds, voicemails, etc. These communications may come from a wide variety of sources. Moreover, the communications can have a wide variety of importance and purposes. Users can be overwhelmed with processing all of these electronic communications.

SUMMARY

Techniques are provided for displaying electronic communications using an HMD. The HMD may display representations of physical objects that identify specific types of electronic communications. Therefore, the user is able to process the electronic communications more efficiently. In some aspects, computer vision is used to allow a user to interact with the representations of the physical objects, which allows the user to process the electronic communications.

One embodiment includes a method for instructing an HMD how to display physical objects that represent electronic communications. The method may include accessing electronic communications, and determining physical objects that are representative of at least a subset of the electronic communications. A head mounted display (HMD) is instructed how to display a representation of the physical objects in this embodiment.

One embodiment is a system comprising a processor and computer storage media having instructions stored thereon which, when executed on the processor, cause the processor to perform the following. The processor accesses electronic communications and determines physical objects that are representative of the electronic communications. Each of the physical objects identifies the corresponding electronic communication as a specific type of communication. The processor provides an image to an HMD that includes a representation of the physical objects.

One embodiment includes computer storage media having instructions stored thereon which, when executed on a processor, cause the processor to perform the following. Electronic communications having content are accessed. One or more images are generated for representing the electronic communications as physical objects that are representative of the electronic communications. The one or more images are provided to a head mounted display (HMD). A selection of a first of the physical objects is received. Content of the electronic communication that corresponds to the first physical object is provided to the HMD in response to the selection.

This summary is provided to introduce a selection of concepts in a simplified form that are further described below in the description. This summary is not intended to identify key features or essential features of the claimed subject matter, nor is it intended to be used to limit the scope of the claimed subject matter.

BRIEF DESCRIPTION OF THE DRAWINGS

In the drawings, like-numbered elements correspond to one another.

DETAILED DESCRIPTION

Techniques are provided for displaying electronic communications using a head mounted display (HMD). The HMD may display various representations of physical objects (e.g., envelopes, post cards, telephones) which identify the type or nature of the electronic communications. For example, email communications might be displayed as a letter, whereas an instant message or text might be displayed as a postcard. Furthermore, the appearance of the physical object may reflect the content of the electronic communication. For example, if the content indicates that the electronic communication is a birthday greeting, then it might be displayed as a birthday card.

The user is able to interact with the representation of the physical object, in some embodiments. For example, computer vision can be used to allow a user to "open a letter" being presented in the HMD. When the user opens the letter, the contents may be displayed. Computer vision might track and analyze the user's hand motions to accomplish the foregoing.

In some embodiments, the user can enter a command to sort or index the electronic communications. For example, the user could request that high priority electronic communications are emphasized in some manner. This might cause the physical objects being displayed in the HMD to be re-arranged in same manner. For example, initially the HMD might make it appear that numerous envelopes are sitting on an actual table in front of the user. The envelopes may be in some random arrangement. Then, in response to the sort request, the HMD displays high priority emails in a separate stack from the rest of the envelopes. Thus, the user may sort or index the electronic communications by priority, time, sender, etc.

Figure 1A:
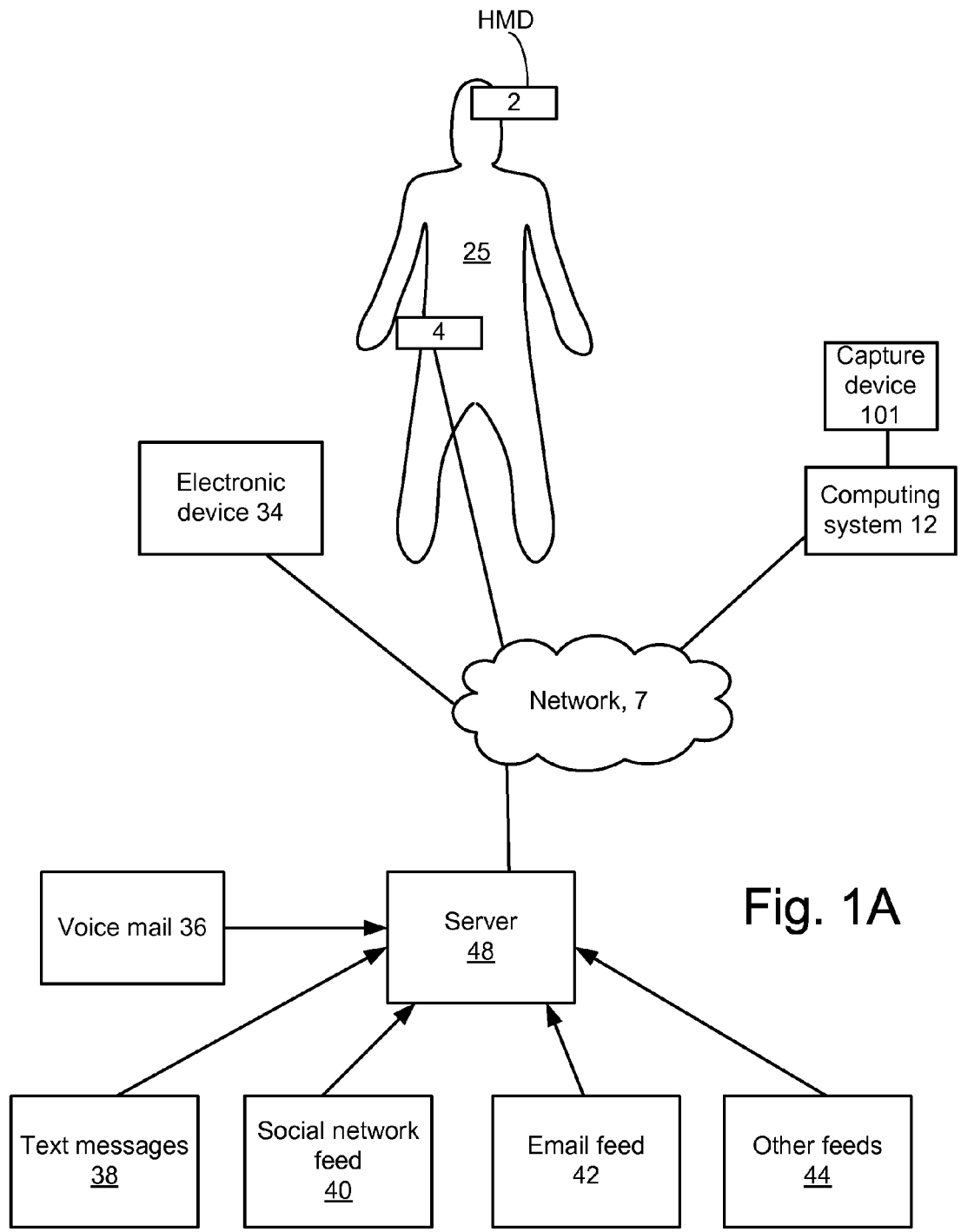
FIGS. 1A, 1B, and 1C depict several environments in which embodiments may be practiced.

FIG. 1A depicts an overview of an environment in which embodiments may be practiced. The user 25 wears an HMD 2, which is capable of displaying images. These may be still images or video streams, or a combination of the two. The HMD 2 may also be able to play audio. The HMD 2 may have a processing unit 4 associated with it. In this example, the user 25 might carry the processing unit 4 in their pocket, wear it on their wrist, etc. The processing unit 4 may communicate with the HMD 2 by wireless communication or wireline. Further details of one example of an HMD 2 are discussed below.

In this embodiment, a server 48 receives electronic communication from various sources. The sources may include sources of voice mails 36, text messages 38, social network feeds 40, electronic mail 42, as well as other feeds 44. In this embodiment, the server 48 processes these electronic communications to determine how they should be presented on the HMD2. For example, the server 48 may determine that a communication from the social network 40 should be presented as a postcard and that a communication from the voice mail system 36 should be presented as a telephone. In one embodiment, the server 48 generates an image that is suitable to be presented on the HMD 2 in order to show the electronic communications as some real world physical object. The image could be a still image or a video stream. The server 48 may send that image over the network 7. The network 7 may be implemented by one or more networks, such as the Internet, a wide area network (WAN), local area network (LAN), etc. The network 7 may be wireless or wireline and may use any communication protocol.

The processing unit 4 may access this image and provide it to the HMD 2 for display. As one alternative, a different electronic device 34 in the vicinity of the user 25 might access the image from the network 7 and forward it to the processing unit 4. The other electronic device 34 could be a laptop computer, personal computer, notepad computer, gaming console, cellular telephone, etc.

In some embodiments, the user is able to interact with the physical representation of the electronic communication. Computer vision may be used to determine how the user intends to interact. Note that computer vision might be used to track hand gestures, eye movements, or any other physical movement or position. In some embodiments, the user's voice or other sound is used to interact. Other techniques, such as brain wave reading may also be used. A capture device 101 and computing system 12 may be used to track and analyze user actions to enable this interaction. Further details of one embodiment of a capture device 101 and computing system 12 are discussed with respect to FIG. 7.

Figure 1B:
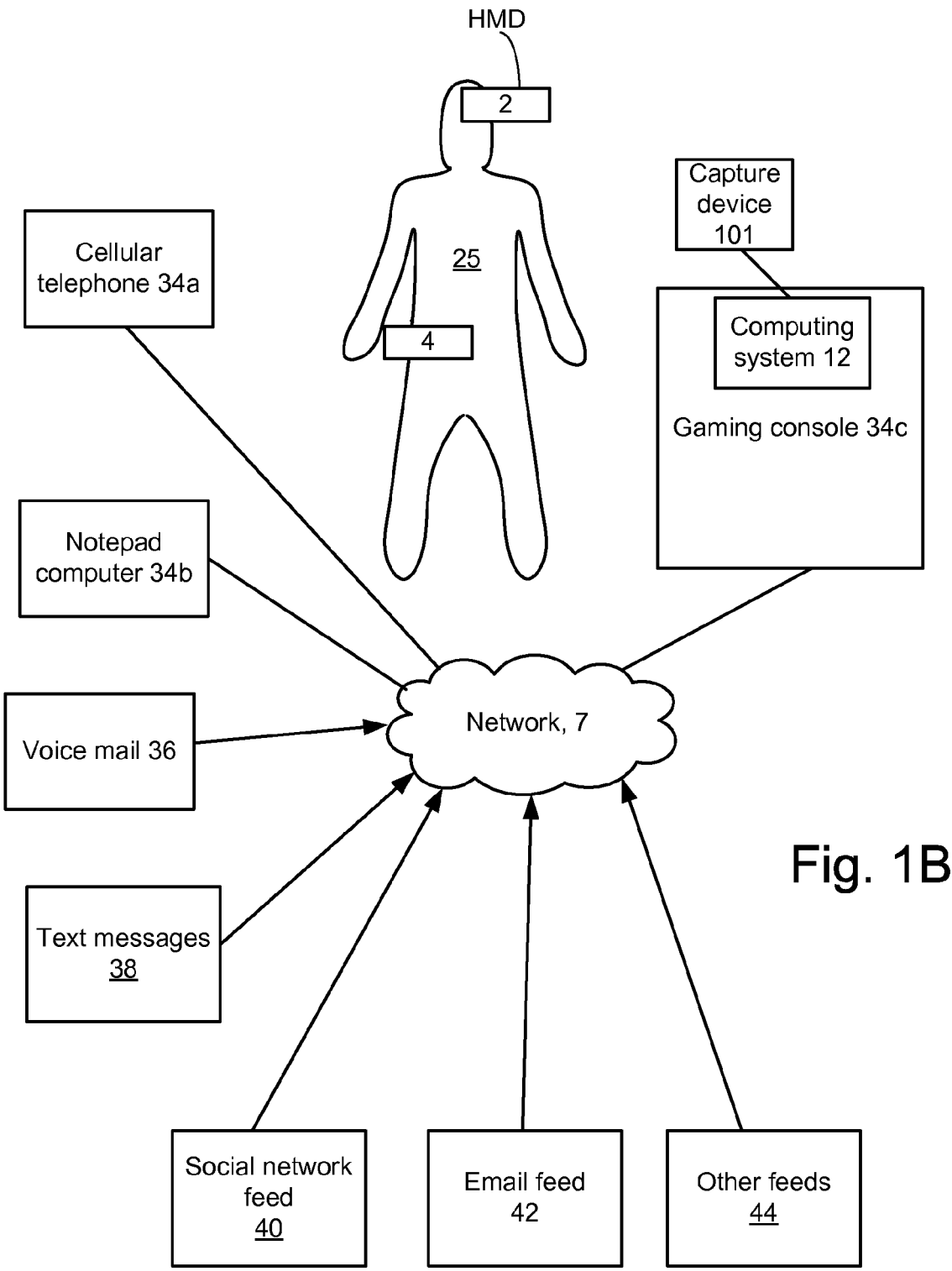

FIG. 1B is a diagram of an environment in which embodiments may be practiced. In this embodiment, rather than a server 48 performing processing to create the images for the HMD 2, some other electronic device may perform this processing. This electronic device 34 may be in the general vicinity of the user 25; however, that is not a requirement. Several examples of such electronic devices are depicted in FIG. 1B. One such example is a cellular telephone 34*a*. In this example, the cellular telephone 34*a* accesses various electronic communications via network 7. The notepad computer 34*b* is another example of an electronic device that could access the communications and create the images for the HMD 2. The gaming console 34*c* is also one example of an electronic device that could access the communications and create the images for the HMD 2. Many other types of electronic devices not explicitly shown in FIG. 1B could access the communications and create the images for the HMD 2.

As with the example of FIG. 1A, the network 7 may be one or more networks. Note that some electronic devices might not be able to access all of the electronic communications from the network 7. For example, some devices might not be able to access the voice mails 36. In some embodiments, an electronic device may access some of the electronic communications form another electronic device, rather than through the network 7. For example, a cellular telephone may provide text messages to another device.

Figure 1C:
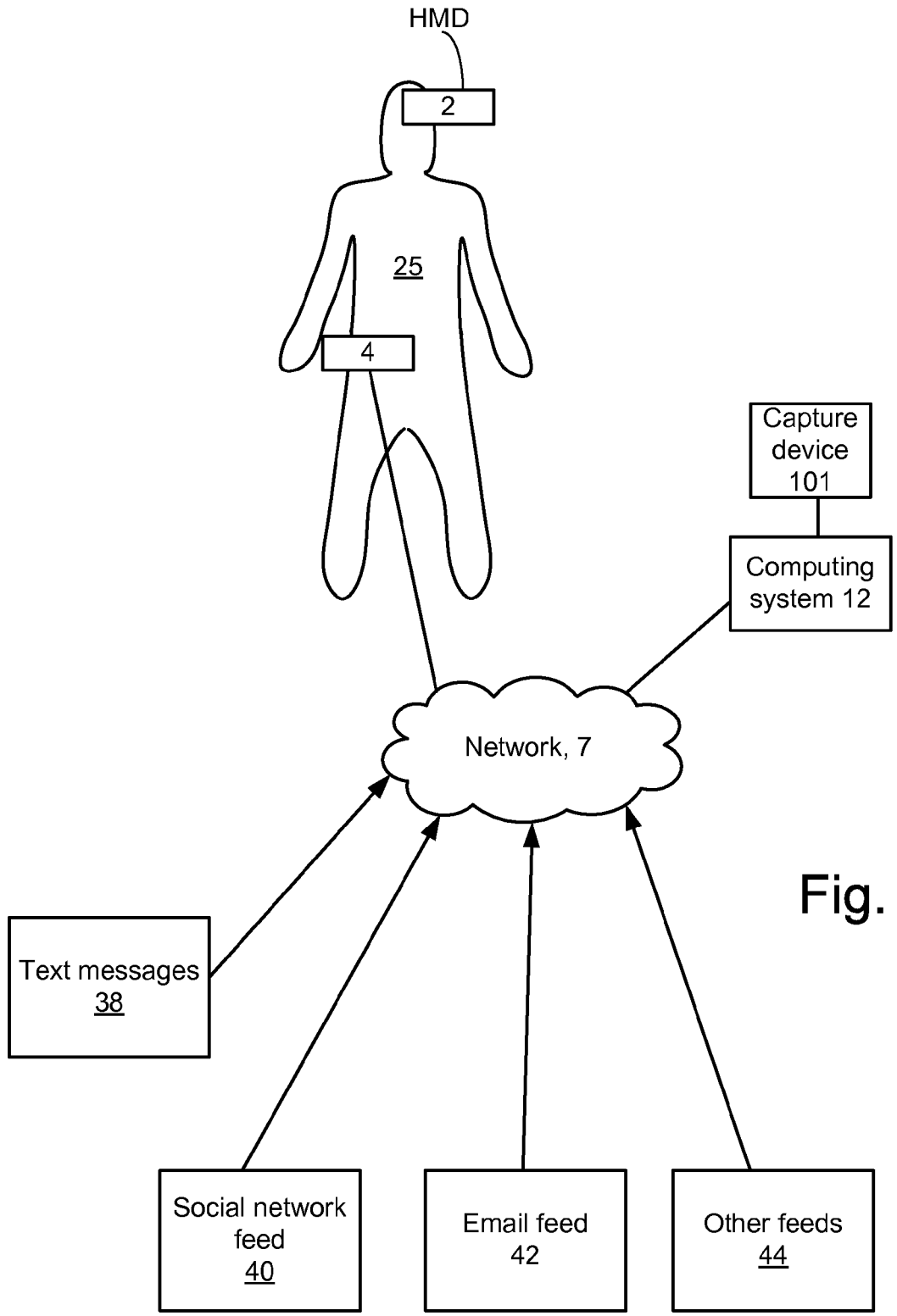

FIG. 1C is a diagram of an environment in which embodiments may be practiced. In this embodiment, the processing unit 4 associated with the HMD 2 is connected to the network 7 in order to access various electronic communications. The processing unit 4 generates the images for presenting the physical objects that represent the electronic communications, in this embodiment.

Figure 2:
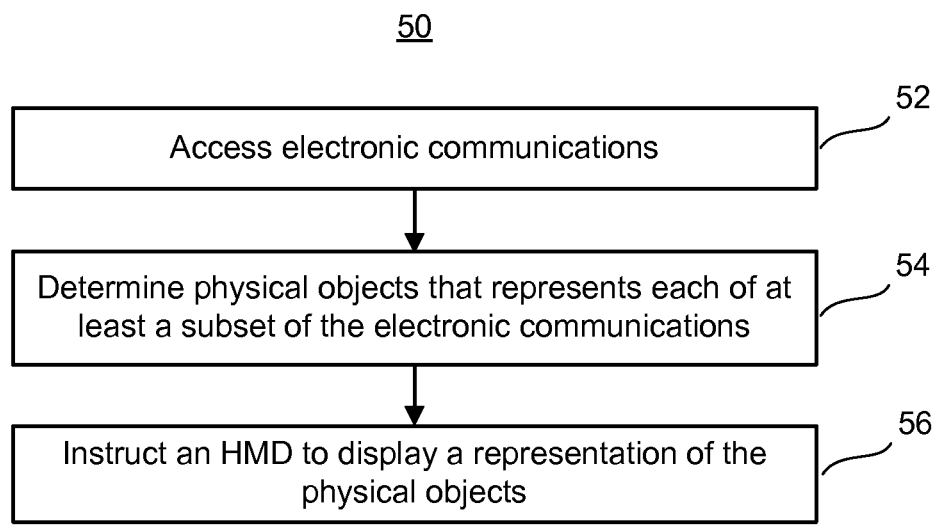
FIG. 2 is a flowchart describing one embodiment of a process for instructing an HMD to display physical objects that represent electronic communications.

FIG. 2 is a flowchart describing one embodiment of a process 50 for instructing an HMD 2 to display physical objects that represent electronic communications. In some embodiments, process 50 is implemented on one or more processors. Instructions for implementing process 50 may be stored on a computer storage device. The instructions which, when executed on one or more processors, may cause the processor(s) to performed steps of process 50. A wide variety of electronic devices may be used to perform process 50. For example, an electronic device that is nearby the user wearing an HMD 2 may perform process 50. Example devices include, but are not limited to, a cellular telephone, a personal computer, a gaming console, a laptop computer, and a notebook computer. Process 50 could also be performed by a processing unit 4 that is associated with an HMD. If the HMD 2 unit itself has sufficient processing power, then the HMD 2 may perform process 50.

In some embodiments, process 50 is performed remotely from the user 25 wearing the HMD 2. For example, a server could perform process 50. It is also possible to perform process 50 in a distributed manner such that different electronic devices perform different steps. Also note that the steps are described in a particular order as a matter of convenience. It will be understood that a different order could be used. FIGS. 1A, 1B, and 1C will be referred to when discussing process 50; however, other environments could be used.

Step 52 is accessing electronic communications. These may be accessed from different sources such as source of voice mail 36, text messages 38, social network feeds 40, emails 42, etc.

Step 54 is determining physical objects that represent at least a subset of the electronic communications. Note that in some embodiments, a decision is made to only inform the user 25 about some subset of the electronic communications. For example, the user might not want to receive work emails at home. In one embodiment, there is a hierarchy for displaying the electronic communications. For example, a birthday card should take priority over junk mail. Therefore, if the number of electronic communications is quite high, a decision could be made to only use the higher priority communications. In one embodiment, a separate physical object is assigned to each of the electronic communications in the subset.

The following example will be used to help explain step 54. Consider if the user has five new emails, two new voice mails, and three communications from a social networking website. One example of step 54 is to determine that five envelopes (for emails), two telephones (for voice mails), and three post cards (for social networking communications) could be used as physical objects to represent the electronic communications. Note that many variations are possible. Additional ways of determining how to arrive at suitable physical objects are discussed herein.

Step 56 is instructing an HMD 2 to display a representation of the physical objects. For example, the HMD 2 may be sent one or more images to present on its display. These one or more images may contain some representation of the physical objects. Note that there are many ways of displaying the physical objects. In one embodiment, the physical objects are made to appear as if they are registered to some actual surface near the user 25. By being "registered" to some actual surface it is meant that the objects are displayed on or near the surface. For example, the objects might appear to be on a table or floating over the table. In one embodiment, the objects are registered to the user's body. In this case, the objects (e.g., mail) may move with the user. Note that the person's body is one example of an actual surface to which the objects may be registered.

Figure 3:
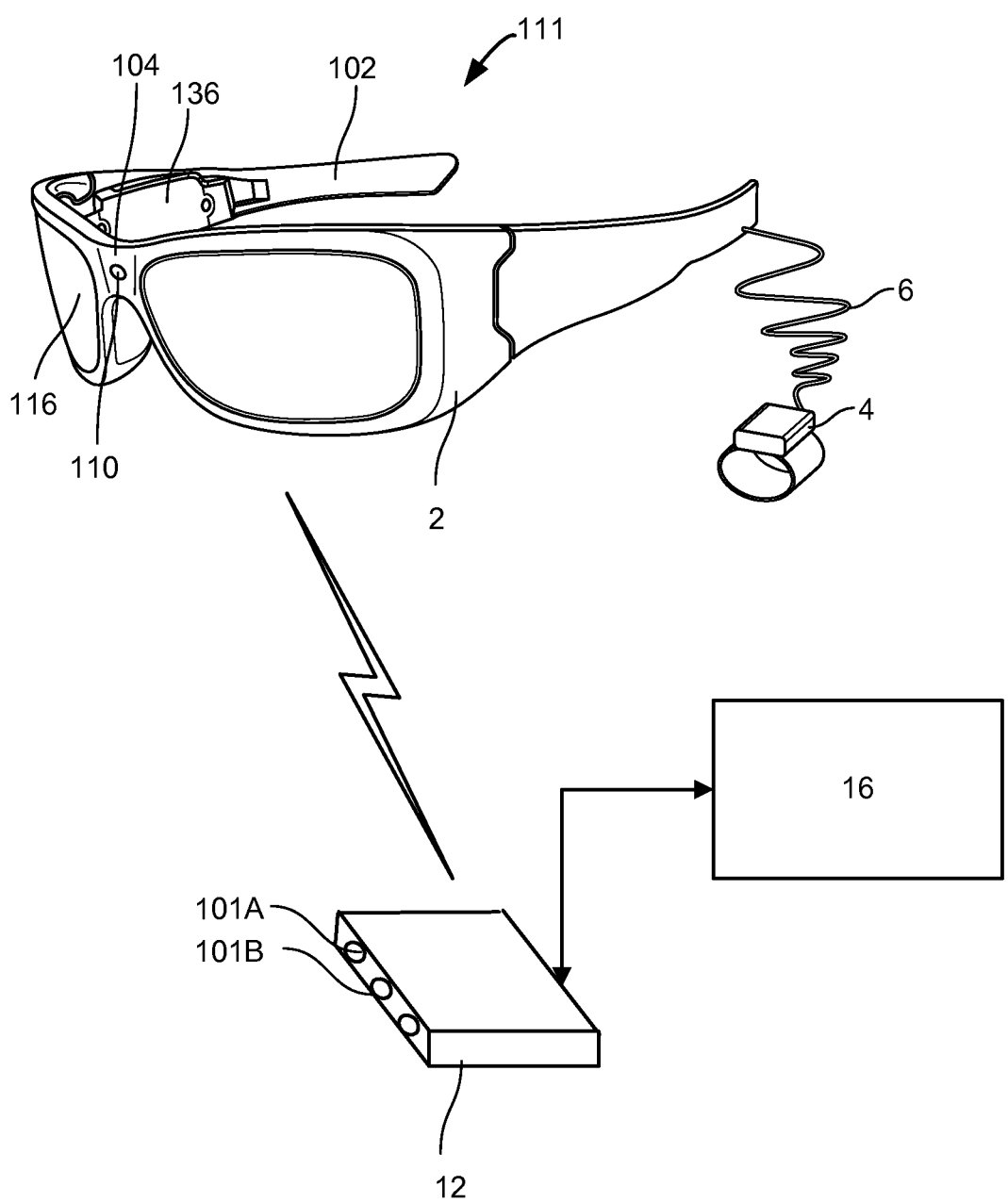
FIG. 3 is a block diagram depicting example components of one embodiment of an HMD device.

As noted, an HMD 2 may be used in some embodiments. The following is a discussion of an example HMD 2 that may be used in various embodiments. FIG. 3 is a block diagram depicting example components of one embodiment of an HMD system 111. The HMD system 111 includes an HMD device 2 in communication with processing unit 4 via wire 6. In other embodiments, HMD device 2 communicates with processing unit 4 via wireless communication. Note that the processing unit 4 could be integrated into the HMD device 2. Head-mounted display device 2, which in one embodiment is in the shape of glasses, including a frame with see-through lenses, is carried on the head of a person so that the person can see through a display and thereby see a real-world scene which includes an image which is not generated by the HMD device. More details of the HMD device 2 are provided below.

In one embodiment, processing unit 4 is carried on the user's wrist and includes much of the computing power used to operate HMD device 2. Processing unit 4 may communicate wirelessly (e.g., using WIFI®, Bluetooth®, infrared (e.g., IrDA or Infrared Data Association standard), or other wireless communication means) to one or more hub computing systems 12.

Hub computing system 12 may be a computer, a gaming system or console, or the like. According to an example embodiment, the hub computing system 12 may include hardware components and/or software components such that hub computing system 12 may be used to execute applications such as gaming applications, non-gaming applications, or the like. In one embodiment, hub computing system 12 may include a processor such as a standardized processor, a specialized processor, a microprocessor, or the like that may execute instructions stored on a processor readable storage device for performing the processes described herein.

In one embodiment, the hub computing system 12 has one or more video capture devices 101, such as video capture devices 101A and 101B. In other embodiments, more or fewer than two capture devices 101 can be used. In one example implementation, the video capture devices 101A and 101B are pointed in different directions so that they capture different portions of the room. It may be advantageous that the field of view of the two capture devices slightly overlap so that hub computing system 12 can understand how the fields of view of the capture devices 101 relate to each other. In this manner, multiple capture devices can be used to view an entire room (or other space). Therefore, the video stream may be based on image data captured by one or more video capture devices. Capture devices 101A and 101B may be, for example, cameras that visually monitor one or more users and the surrounding space such that gestures and/or movements performed by the one or more users, as well as the structure of the surrounding space, may be captured, analyzed, and tracked to perform one or more controls or actions.

Hub computing system 12 may be connected to an audiovisual device 16 such as a television, a monitor, a high-definition television (HDTV), or the like that may provide game or application visuals. For example, hub computing system 12 may include a video adapter such as a graphics card and/or an audio adapter such as a sound card that may provide audiovisual signals associated with the game application, non-game application, etc. The audiovisual device 16 may receive the audiovisual signals from hub computing system 12 and may then output the game or application visuals and/or audio associated with the audiovisual signals. According to one embodiment, the audiovisual device 16 may be connected to hub computing system 12 via, for example, an S-Video cable, a coaxial cable, an HDMI cable, a DVI cable, a VGA cable, component video cable, RCA cables, etc. In one example, audiovisual device 16 includes internal speakers. In other embodiments, audiovisual device 16, a separate stereo or hub computing system 12 is connected to external speakers.

Hub computing device 10, with capture devices 101A and 101B, may be used to recognize, analyze, and/or track human (and other types of) targets. For example, a person wearing HMD device 2 may be tracked using the capture devices 101A and 101B such that the gestures and/or actions of the person may be captured. In some embodiments, tracking the user's actions allows the user to interact with the representations of the physical objects. For example, the user could open a letter such that its contents are then displayed on the HMD 2.

Figure 4:
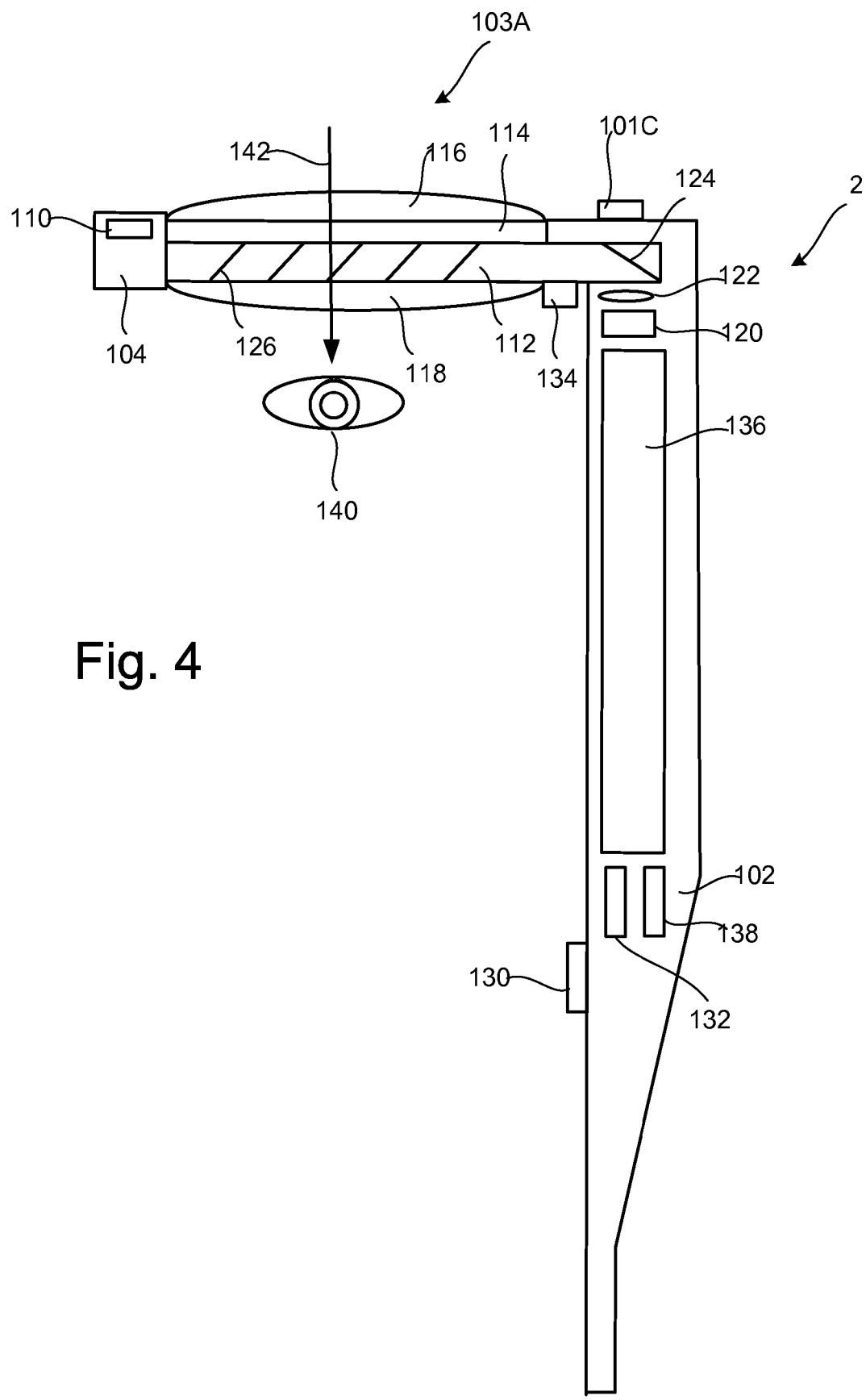
FIG. 4 is a top view of a portion of one embodiment of a HMD device.

FIG. 4 depicts a top view of a portion of one embodiment of HMD device 2, including a portion of the frame that includes temple 102 and nose bridge 104. Only the right side of HMD device 2 is depicted. Built into nose bridge 104 is a microphone 110 for recording sounds and transmitting that audio data to processing unit 4, as described below. At the front of HMD device 2 is room-facing video camera 101C that can capture video and still images. A room-facing depth camera could also be provided. Those images are transmitted to processing unit 4, as described below. The room-facing video camera 101C faces outward and has a viewpoint similar to that of the user. The video camera 101C is one example of a mobile video capture device 101.

A portion of the frame of HMD device 2 will surround a display 103A (that includes one or more lenses). In order to show the components of HMD device 2, a portion of the frame surrounding the display is not depicted. In this embodiment, the display 103A includes a light guide optical element 112 (or other optical element), opacity filter 114, see-through lens 116 and see-through lens 118. In one embodiment, opacity filter 114 is behind and aligned with see-through lens 116, light guide optical element 112 is behind and aligned with opacity filter 114, and see-through lens 118 is behind and aligned with light guide optical element 112. See-through lenses 116 and 118 are standard lenses used in eye glasses and can be made to any prescription (including no prescription). In one embodiment, see-through lenses 116 and 118 can be replaced by a variable prescription lens. In some embodiments, HMD device 2 will include only one see-through lens or no see-through lenses. In another alternative, a prescription lens can go inside light guide optical element 112. Opacity filter 114 filters out natural light (either on a per pixel basis or uniformly) to enhance the contrast of the virtual imagery. Light guide optical element 112 channels artificial light to the eye. More details of opacity filter 114 and light guide optical element 112 are provided below.

Mounted to or inside temple 102 is an image source, which (in one embodiment) includes microdisplay 120 for projecting a virtual image and lens 122 for directing images from microdisplay 120 into light guide optical element 112. In one embodiment, lens 122 is a collimating lens. A remote display device can include microdisplay 120, one or more optical components such as the lens 122 and light guide 112, and associated electronics such as a driver. Such a remote display device is associated with the HMD device, and emits light to a user's eye, where the light represents the physical objects that correspond to the electronic communications.

Control circuits 136 provide various electronics that support the other components of HMD device 2. More details of control circuits 136 are provided below with respect to FIG. 5. Inside, or mounted to temple 102, are ear phones 130, inertial sensors 132 and temperature sensor 138. In one embodiment, inertial sensors 132 include a three axis magnetometer 132A, three axis gyro 132B and three axis accelerometer 132C (See FIG. 5). The inertial sensors are for sensing position, orientation, sudden accelerations of HMD device 2. For example, the inertial sensors can be one or more sensors which are used to determine an orientation and/or location of user's head.

Microdisplay 120 projects an image through lens 122. There are different image generation technologies that can be used to implement microdisplay 120. For example, microdisplay 120 can be implemented in using a transmissive projection technology where the light source is modulated by optically active material, backlit with white light. These technologies are usually implemented using LCD type displays with powerful backlights and high optical energy densities. Microdisplay 120 can also be implemented using a reflective technology for which external light is reflected and modulated by an optically active material. The illumination is forward lit by either a white source or RGB source, depending on the technology. Digital light processing (DLP), liquid crystal on silicon (LCOS) and MIRASOL® (a display technology from QUALCOMM, INC.) are all examples of reflective technologies which are efficient as most energy is reflected away from the modulated structure. Additionally, microdisplay 120 can be implemented using an emissive technology where light is generated by the display. For example, a PicoP™-display engine (available from MICROVISION, INC.) emits a laser signal with a micro mirror steering either onto a tiny screen that acts as a transmissive element or beamed directly into the eye (e.g., laser).

Light guide optical element 112 transmits light from microdisplay 120 to the eye 140 of the person wearing HMD device 2. Light guide optical element 112 also allows light from in front of the HMD device 2 to be transmitted through light guide optical element 112 to eye 140, as depicted by arrow 142, thereby allowing the person to have an actual direct view of the space in front of HMD device 2 in addition to receiving a virtual image from microdisplay 120. Thus, the walls of light guide optical element 112 are see-through. Light guide optical element 112 includes a first reflecting surface 124 (e.g., a mirror or other surface). Light from microdisplay 120 passes through lens 122 and becomes incident on reflecting surface 124. The reflecting surface 124 reflects the incident light from the microdisplay 120 such that light is trapped inside a planar, substrate comprising light guide optical element 112 by internal reflection. After several reflections off the surfaces of the substrate, the trapped light waves reach an array of selectively reflecting surfaces 126. Note that only one of the five surfaces is labeled 126 to prevent over-crowding of the drawing.

Reflecting surfaces 126 couple the light waves incident upon those reflecting surfaces out of the substrate into the eye 140 of the user. As different light rays will travel and bounce off the inside of the substrate at different angles, the different rays will hit the various reflecting surface 126 at different angles. Therefore, different light rays will be reflected out of the substrate by different ones of the reflecting surfaces. The selection of which light rays will be reflected out of the substrate by which surface 126 is engineered by selecting an appropriate angle of the surfaces 126. More details of a light guide optical element can be found in U.S. Patent Application Publication 2008/0285140, Ser. No. 12/214,366, published on Nov. 20, 2008, incorporated herein by reference in its entirety. In one embodiment, each eye will have its own light guide optical element 112. When the HMD device has two light guide optical elements, each eye can have its own microdisplay 120 that can display the same image in both eyes or different images in the two eyes. In another embodiment, there can be one light guide optical element which reflects light into both eyes.

In some embodiments, the HMD has an opacity filter 114. Opacity filter 114, which is aligned with light guide optical element 112, selectively blocks natural light, either uniformly or on a per-pixel basis, from passing through light guide optical element 112. In one embodiment, the opacity filter can be a see-through LCD panel, electrochromic film, or similar device which is capable of serving as an opacity filter. Such a see-through LCD panel can be obtained by removing various layers of substrate, backlight and diffusers from a conventional LCD. The LCD panel can include one or more light-transmissive LCD chips which allow light to pass through the liquid crystal. Such chips are used in LCD projectors, for instance.

Opacity filter 114 can include a dense grid of pixels, where the light transmissivity of each pixel is individually controllable between minimum and maximum transmissivities. While a transmissivity range of 0-100% is ideal, more limited ranges are also acceptable. As an example, a monochrome LCD panel with no more than two polarizing filters is sufficient to provide an opacity range of about 50% to 90% per pixel, up to the resolution of the LCD. At the minimum of 50%, the lens will have a slightly tinted appearance, which is tolerable. 100% transmissivity represents a perfectly clear lens. An "alpha" scale can be defined from 0-100%, where 0% allows no light to pass and 100% allows all light to pass. The value of alpha can be set for each pixel by the opacity filter control circuit 224 described below. The opacity filter 114 may be set to whatever transmissivity is desired when presenting the viewing windows 73.

Figure 5:
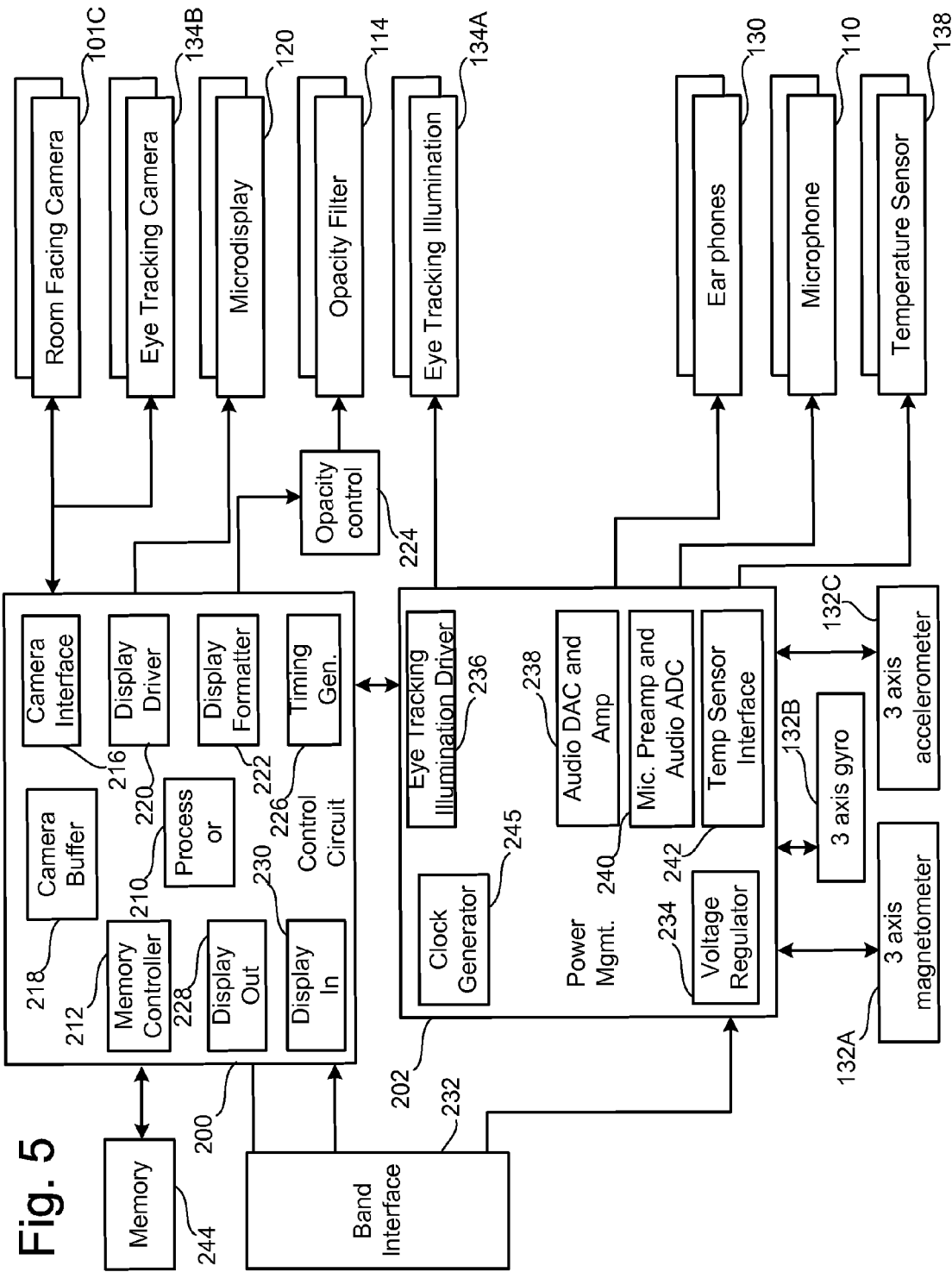
FIG. 5 is a block diagram of one embodiment of the components of a HMD device.
Figure 6:
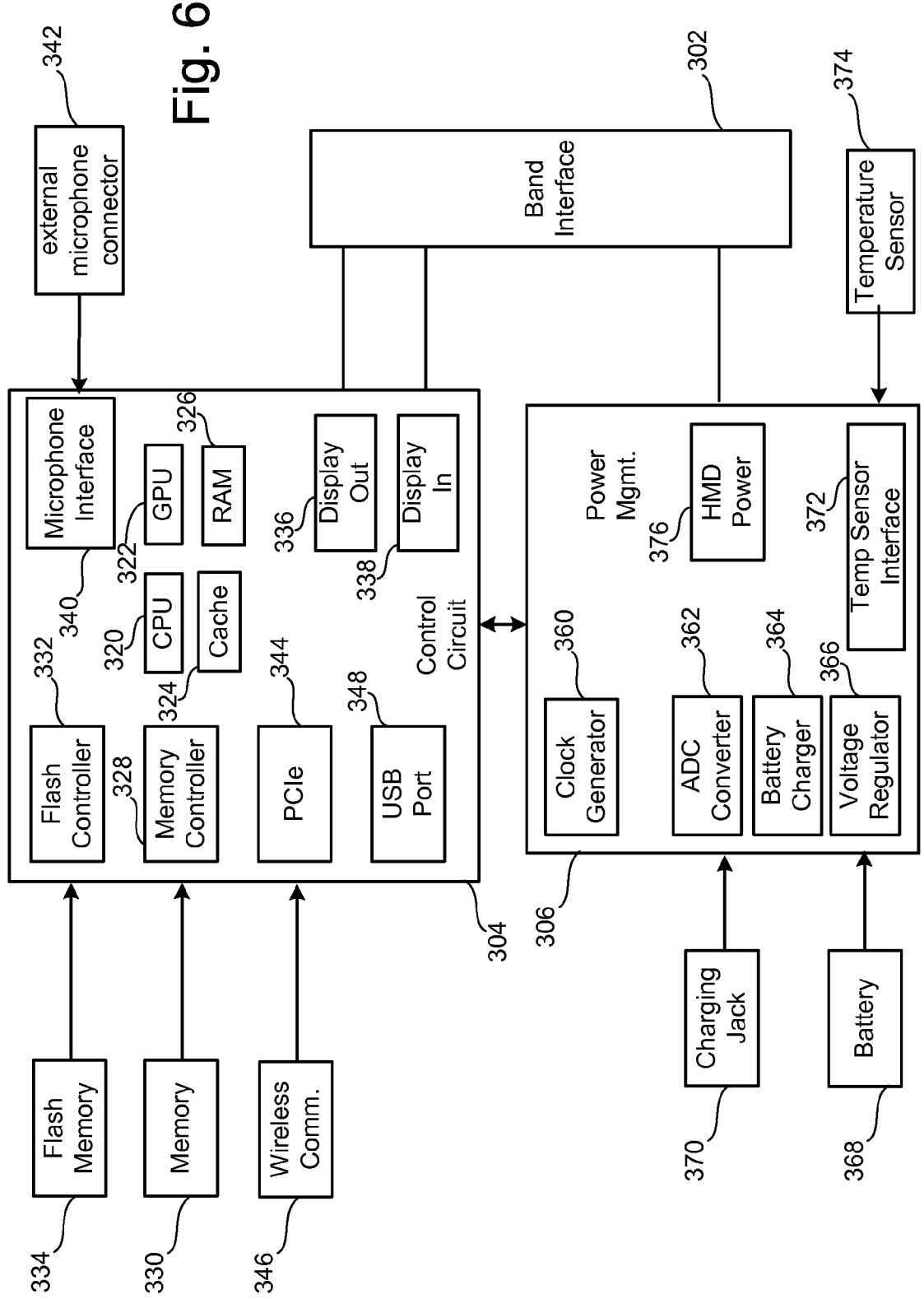
FIG. 6 is a block diagram of one embodiment of the components of a processing unit associated with a HMD device.

FIG. 5 is a block diagram depicting the various components of one embodiment of HMD device 2. FIG. 6 is a block diagram describing the various components of one embodiment of processing unit 4. Note that in some embodiments, the various components of the HMD device 2 and the processing unit 4 may be combined in a single electronic device. Additionally, the HMD device components of FIG. 5 include many sensors that track various conditions. Head-mounted display device may receive images from processing unit 4 and may provide sensor information back to processing unit 4. Processing unit 4, the components of which are depicted in FIG. 5, may receive the sensory information from HMD device 2 and also from hub computing device 12 (See FIG. 3).

Note that some of the components of FIG. 5 (e.g., room facing camera 101C, eye tracking camera 134B, microdisplay 120, opacity filter 114, eye tracking illumination 134A, earphones 130, and temperature sensor 138) are shown in shadow to indicate that there are two of each of those devices, one for the left side and one for the right side of HMD device. Regarding the room-facing camera 101C, in one approach one camera is used to obtain images using visible light. These images can be used to identify the location of a video display screen in a room using machine vision techniques. In another approach, two or more cameras with a known spacing between them are used as a depth camera to also obtain depth data for objects in a room, indicating the distance from the cameras/HMD device to the object. The cameras of the HMD device can essentially duplicate the functionality of the depth camera provided by the computer hub 12 (see also capture device 101A of FIG. 3).

FIG. 5 shows the control circuit 200 in communication with the power management circuit 202. Control circuit 200 includes processor 210, memory controller 212 in communication with memory 244 (e.g., DRAM), camera interface 216, camera buffer 218, display driver 220, display formatter 222, timing generator 226, display out interface 228, and display in interface 230. In one embodiment, all of components of control circuit 200 are in communication with each other via dedicated lines or one or more buses. In another embodiment, each of the components of control circuit 200 is in communication with processor 210. Camera interface 216 provides an interface to the two room facing cameras 112 and stores images received from the room facing cameras in camera buffer 218. Display driver 220 drives microdisplay 120. Display formatter 222 provides information, about the images being displayed on microdisplay 120, to opacity control circuit 224, which controls opacity filter 114. Timing generator 226 is used to provide timing data for the system. Display out interface 228 is a buffer for providing images from room facing cameras 112 to the processing unit 4. Display in 230 is a buffer for receiving images to be displayed on microdisplay 120. Display out 228 and display in 230 communicate with band interface 232 which is an interface to processing unit 4.

Power management circuit 202 includes voltage regulator 234, eye tracking illumination driver 236, audio DAC and amplifier 238, microphone preamplifier audio ADC 240, temperature sensor interface 242 and clock generator 245. Voltage regulator 234 receives power from processing unit 4 via band interface 232 and provides that power to the other components of HMD device 2. Eye tracking illumination driver 236 provides the infrared (IR) light source for eye tracking illumination 134A, as described above. Audio DAC and amplifier 238 receives the audio information from earphones 130. Microphone preamplifier and audio ADC 240 provides an interface for microphone 110. Temperature sensor interface 242 is an interface for temperature sensor 138. Power management unit 202 also provides power and receives data back from three-axis magnetometer 132A, three-axis gyroscope 132B and three axis accelerometer 132C.

FIG. 6 is a block diagram describing the various components of processing unit 4. Control circuit 304 is in communication with power management circuit 306. Control circuit 304 includes a central processing unit (CPU) 320, graphics processing unit (GPU) 322, cache 324, RAM 326, memory control 328 in communication with memory 330 (e.g., D-RAM), flash memory controller 332 in communication with flash memory 334 (or other type of non-volatile storage), display out buffer 336 in communication with HMD device 2 via band interface 302 and band interface 232, display in buffer 338 in communication with HMD device 2 via band interface 302 and band interface 232, microphone interface 340 in communication with an external microphone connector 342 for connecting to a microphone, PCI express interface 344 for connecting to a wireless communication device 346, and USB port(s) 348.

In one embodiment, wireless communication component 346 can include a WIFI® enabled communication device, Bluetooth communication device, infrared communication device, etc. The wireless communication component 346 is a wireless communication interface which, in one implementation, receives data in synchronism with the content displayed by the video display screen 16.

The USB port can be used to dock the processing unit 4 to hub computing device 12 in order to load data or software onto processing unit 4, as well as charge processing unit 4. In one embodiment, CPU 320 and GPU 322 are the main workhorses for determining where, when and how to place physical objects that represent electronic communications in images.

Power management circuit 306 includes clock generator 360, analog to digital converter 362, battery charger 364, voltage regulator 366, HMD power source 376, and temperature sensor interface 372 in communication with temperature sensor 374 (located on the wrist band of processing unit 4). Analog to digital converter 362 is connected to a charging jack 370 for receiving an AC supply and creating a DC supply for the system. Voltage regulator 366 is in communication with battery 368 for supplying power to the system. Battery charger 364 is used to charge battery 368 (via voltage regulator 366) upon receiving power from charging jack 370. HMD power source 376 provides power to the HMD device 2.

Figure 7:
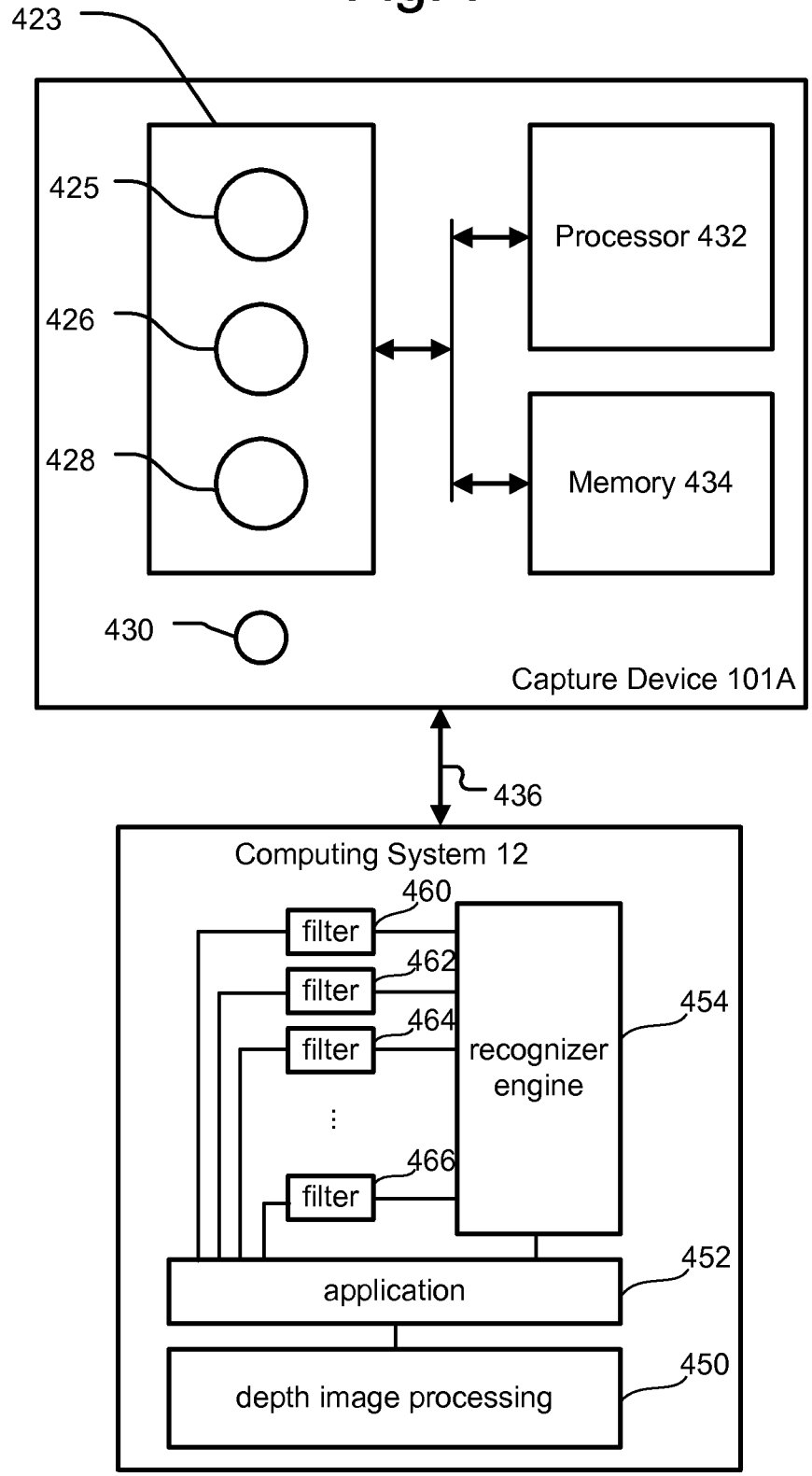
FIG. 7 is a block diagram of one embodiment of the components of a hub computing system used with a HMD device.

FIG. 7 illustrates an example embodiment of hub computing system 12 with a video capture device. In one embodiment, capture devices 101A and 101B are the same structure, therefore, FIG. 7 only shows capture device 101A. Note that the video capture device 101A is static (e.g., not mobile) in this embodiment.

According to an example embodiment, video capture device 101A may be configured to capture video with depth information including a depth image that may include depth values via any suitable technique including, for example, time-of-flight, structured light, stereo image, or the like. According to one embodiment, the video capture device 101A may organize the depth information into "Z layers," or layers that may be perpendicular to a Z axis extending from the depth camera along its line of sight.

Video capture device 101A may include a camera component 423, which may be or may include a depth camera that may capture a depth image of a scene. The depth image may include a two-dimensional (2-D) pixel area of the captured scene where each pixel in the 2-D pixel area may represent a depth value such as a distance in, for example, centimeters, millimeters, or the like of an object in the captured scene from the camera.

Camera component 423 may include an infrared (IR) light component 425, an infrared camera 426, and an RGB (visual image) camera 428 that may be used to capture the depth image of a scene. A 3-D camera is formed by the combination of the infrared emitter 24 and the infrared camera 26. For example, in time-of-flight analysis, the IR light component 425 of the capture device 101A may emit an infrared light onto the scene and may then use sensors (in some embodiments, including sensors not shown) to detect the backscattered light from the surface of one or more targets and objects in the scene using, for example, the 3-D camera 426 and/or the RGB camera 428. In some embodiments, pulsed infrared light may be used such that the time between an outgoing light pulse and a corresponding incoming light pulse may be measured and used to determine a physical distance from the capture device 101A to a particular location on the targets or objects in the scene. Additionally, in other example embodiments, the phase of the outgoing light wave may be compared to the phase of the incoming light wave to determine a phase shift. The phase shift may then be used to determine a physical distance from the capture device to a particular location on the targets or objects.

According to another example embodiment, time-of-flight analysis may be used to indirectly determine a physical distance from the capture device 101A to a particular location on the targets or objects by analyzing the intensity of the reflected beam of light over time via various techniques including, for example, shuttered light pulse imaging.

In another example embodiment, video capture device 101A may use a structured light to capture depth information. In such an analysis, patterned light (i.e., light displayed as a known pattern such as grid pattern, a stripe pattern, or different pattern) may be projected onto the scene via, for example, the IR light component 425. Upon striking the surface of one or more targets or objects in the scene, the pattern may become deformed in response. Such a deformation of the pattern may be captured by, for example, the 3-D camera 426 and/or the RGB camera 428 (and/or other sensor) and may then be analyzed to determine a physical distance from the capture device to a particular location on the targets or objects. In some implementations, the IR light component 425 is displaced from the cameras 425 and 426 so triangulation can be used to determined distance from cameras 425 and 426. In some implementations, the capture device 101A will include a dedicated IR sensor to sense the IR light, or a sensor with an IR filter.

According to another embodiment, the capture device 101A may include two or more physically separated cameras that may view a scene from different angles to obtain visual stereo data that may be resolved to generate depth information. Other types of depth image sensors can also be used to create a depth image.

The video capture device 101A may further include a microphone 430, which includes a transducer or sensor that may receive and convert sound into an electrical signal. Microphone 430 may be used to receive audio signals that may also be provided by hub computing system 12.

In an example embodiment, the video capture device 101A may further include a processor 432 that may be in communication with the image camera component 423. Processor 432 may include a standardized processor, a specialized processor, a microprocessor, or the like that may execute instructions including, for example, instructions for receiving a depth image, generating the appropriate data format (e.g., frame) and transmitting the data to hub computing system 12.

Video capture device 101A may further include a memory 434 that may store the instructions that are executed by processor 432, images or frames of images captured by the 3-D camera and/or RGB camera, or any other suitable information, images, or the like. According to an example embodiment, memory 434 may include random access memory (RAM), read only memory (ROM), cache, flash memory, a hard disk, or any other suitable storage component. As shown in FIG. 7, in one embodiment, memory 434 may be a separate component in communication with the image capture component 423 and processor 432. According to another embodiment, the memory 434 may be integrated into processor 432 and/or the image capture component 423.

Video capture device 101A is in communication with hub computing system 12 via a communication link 436. The communication link 436 may be a wired connection including, for example, a USB connection, a FireWire connection, an Ethernet cable connection, or the like and/or a wireless connection such as a wireless 802.11b, g, a, or n connection. According to one embodiment, hub computing system 12 may provide a clock to capture device 101A that may be used to determine when to capture, for example, a scene via the communication link 436. Additionally, the video capture device 101A provides the depth information and visual (e.g., RGB or other color) images captured by, for example, the 3-D camera 426 and/or the RGB camera 428 to hub computing system 12 via the communication link 436. In one embodiment, the depth images and visual images are transmitted at 30 frames per second; however, other frame rates can be used.

Hub computing system 12 includes depth image processing module 450. Depth image processing may be used to determine depth to various objects in the FOV.

Recognizer engine 454 is associated with a collection of filters 460, 462, 464, . . . , 466 each comprising information concerning a gesture, action or condition that may be performed by any person or object detectable by capture device 101A or 101B. For example, the data from capture device 101A may be processed by filters 460, 462, 464, . . . , 466 to identify when a user or group of users has performed one or more gestures or other actions. Those gestures may be associated with various controls. For example, a user might sort the electronic communications using gestures.

Capture device 101A provides RGB images (or visual images in other formats or color spaces) and depth images to hub computing system 12. The depth image may be a plurality of observed pixels where each observed pixel has an observed depth value. For example, the depth image may include a two-dimensional (2-D) pixel area of the captured scene where each pixel in the 2-D pixel area may have a depth value such as distance of an object in the captured scene from the capture device. Hub computing system 12 will use the RGB images and depth images to track a user's or object's movements. For example, the system may track a skeleton of a person using the depth images. There are many methods that can be used to track the skeleton of a person using depth images.

More information about recognizer engine 454 can be found in U.S. patent application Ser. No. 12/422,661, "Gesture Recognizer System Architecture," filed on Apr. 13, 2009, incorporated herein by reference in its entirety. More information about recognizing gestures can be found in U.S. 2010/0194762, "Standard Gestures," published Aug. 5, 2010, and U.S. patent application Ser. No. 12/474,655, "Gesture Tool" filed on May 29, 2009, both of which are incorporated herein by reference in their entirety.

Figure 8:
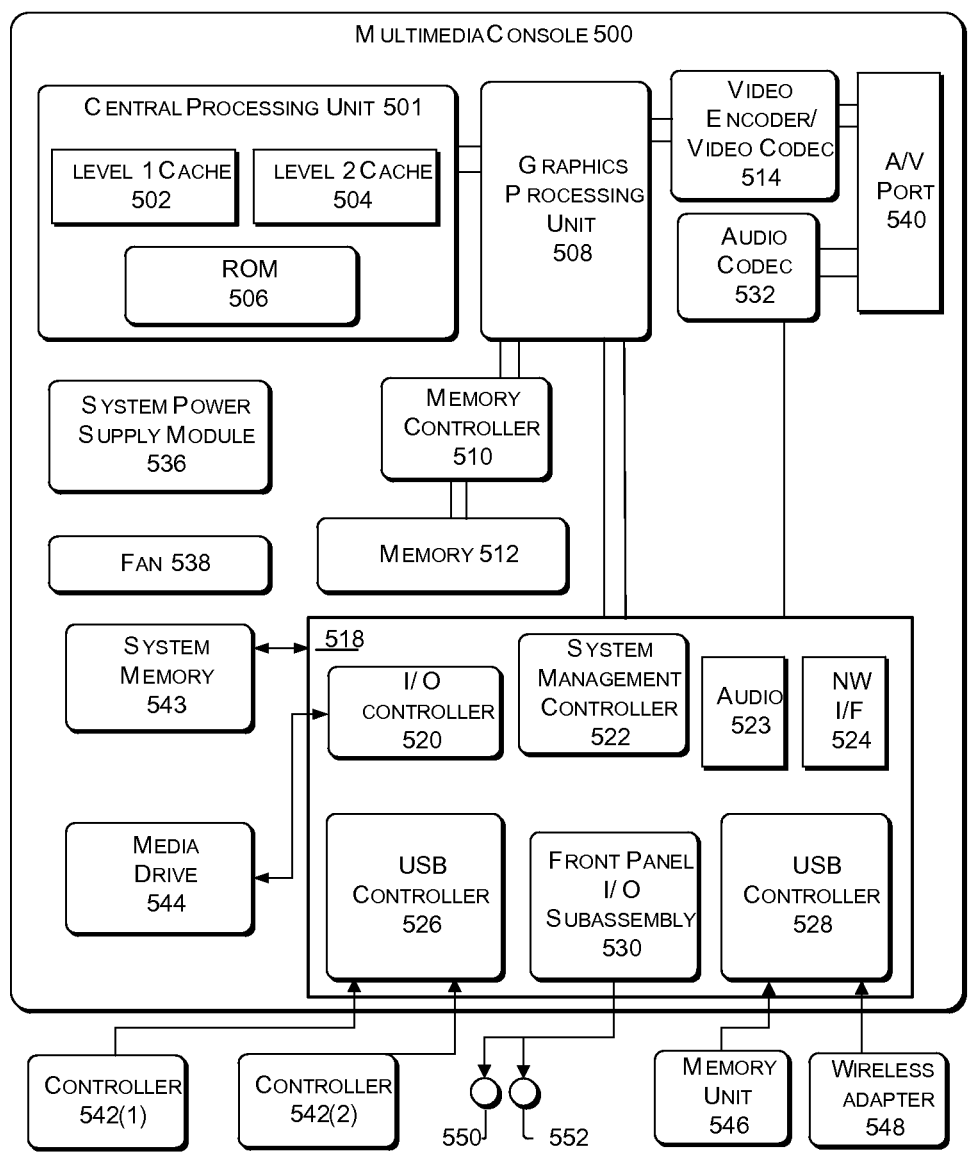
FIG. 8 is a block diagram of one embodiment of a computing system that can be used to implement the hub computing system described herein.

FIG. 8 illustrates an example embodiment of a computing system that may be used to implement hub computing system 12. As shown in FIG. 8, the multimedia console 500 has a central processing unit (CPU) 501 having a level 1 cache 502, a level 2 cache 504, and a flash ROM (Read Only Memory) 506. The level 1 cache 502 and a level 2 cache 504 temporarily store data and hence reduce the number of memory access cycles, thereby improving processing speed and throughput. CPU 501 may be provided having more than one core, and thus, additional level 1 and level 2 caches 502 and 504. The flash ROM 506 may store executable code that is loaded during an initial phase of a boot process when the multimedia console 500 is powered on.

A graphics processing unit (GPU) 508 and a video encoder/video codec (coder/decoder) 514 form a video processing pipeline for high speed and high resolution graphics processing. Data is carried from the graphics processing unit 508 to the video encoder/video codec 514 via a bus. The video processing pipeline outputs data to an A/V (audio/video) port 540 for transmission to a television or other display. A memory controller 510 is connected to the GPU 508 to facilitate processor access to various types of memory 512, such as, but not limited to, a RAM (Random Access Memory).

The multimedia console 500 includes an I/O controller 520, a system management controller 522, an audio processing unit 523, a network interface 524, a first USB host controller 526, a second USB controller 528 and a front panel I/O subassembly 530 that are preferably implemented on a module 518. The USB controllers 526 and 528 serve as hosts for peripheral controllers 542(1)-542(2), a wireless adapter 548, and an external memory device 546 (e.g., flash memory, external CD/DVD ROM drive, removable media, etc.). The network interface 524 and/or wireless adapter 548 provide access to a network (e.g., the Internet, home network, etc.) and may be any of a wide variety of various wired or wireless adapter components including an Ethernet card, a modem, a Bluetooth module, a cable modem, and the like.

System memory 543 is provided to store application data that is loaded during the boot process. A media drive 544 is provided and may comprise a DVD/CD drive, Blu-Ray drive, hard disk drive, or other removable media drive, etc. The media drive 544 may be internal or external to the multimedia console 500. Application data may be accessed via the media drive 544 for execution, playback, etc. by the multimedia console 500. The media drive 544 is connected to the I/O controller 520 via a bus, such as a Serial ATA bus or other high speed connection (e.g., IEEE 1394 serial bus interface).

The system management controller 522 provides a variety of service functions related to assuring availability of the multimedia console 500. The audio processing unit 523 and an audio codec 532 form a corresponding audio processing pipeline with high fidelity and stereo processing. Audio data is carried between the audio processing unit 523 and the audio codec 532 via a communication link. The audio processing pipeline outputs data to the A/V port 540 for reproduction by an external audio user or device having audio capabilities.

The front panel I/O subassembly 530 supports the functionality of the power button 550 and the eject button 552, as well as any LEDs (light emitting diodes) or other indicators exposed on the outer surface of the multimedia console 100. A system power supply module 536 provides power to the components of the multimedia console 100. A fan 538 cools the circuitry within the multimedia console 500.

The CPU 501, GPU 508, memory controller 510, and various other components within the multimedia console 500 are interconnected via one or more buses, including serial and parallel buses, a memory bus, a peripheral bus, and a processor or local bus using any of a variety of bus architectures. Such architectures can include a Peripheral Component Interconnects (PCI) bus, PCI-Express bus, etc.

When the multimedia console 500 is powered on, application data may be loaded from the system memory 543 into memory 512 and/or caches 502, 504 and executed on the CPU 501. The application may present a graphical user interface that provides a consistent user experience when navigating to different media types available on the multimedia console 500. In operation, applications and/or other media contained within the media drive 544 may be launched or played from the media drive 544 to provide additional functionalities to the multimedia console 500.

The multimedia console 500 may be operated as a standalone system by simply connecting the system to a television or other display. In this standalone mode, the multimedia console 500 allows one or more users to interact with the system, watch movies, or listen to music. However, with the integration of broadband connectivity made available through the network interface 524 or the wireless adapter 548, the multimedia console 500 may further be operated as a participant in a larger network community. Additionally, multimedia console 500 can communicate with processing unit 4 via wireless adaptor 548.

When the multimedia console 500 is powered ON, a set amount of hardware resources are reserved for system use by the multimedia console operating system. These resources may include a reservation of memory, CPU and GPU cycle, networking bandwidth, etc. Because these resources are reserved at system boot time, the reserved resources do not exist from the application's view. In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., pop ups) are displayed by using a GPU interrupt to schedule code to render a popup into an overlay. The amount of memory used for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resync is eliminated.

After multimedia console 500 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 501 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager controls the gaming application audio level (e.g., mute, attenuate) when system applications are active.

Optional input devices (e.g., controllers 542(1) and 542(2)) are shared by gaming applications and system applications. The input devices are not reserved resources, but are to be switched between system applications and the gaming application such that each will have a focus of the device. The application manager preferably controls the switching of input stream, without knowing the gaming application's knowledge and a driver maintains state information regarding focus switches. Capture devices 101A and 101B may define additional input devices for the console 500 via USB controller 526 or other interface. In other embodiments, hub computing system 12 can be implemented using other hardware architectures. No one hardware architecture is required.

Figure 9:
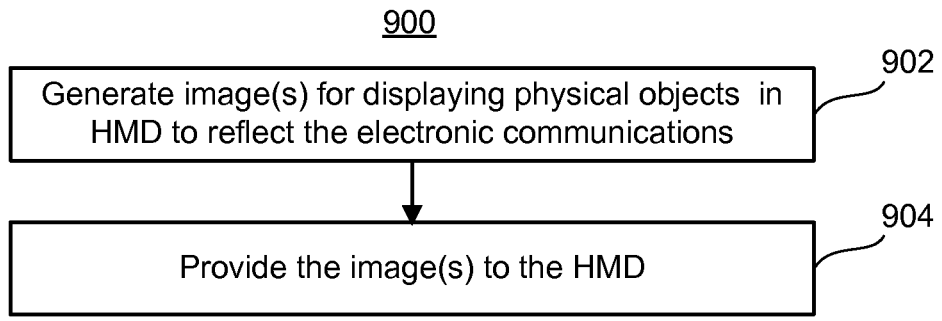
FIG. 9 is a flowchart of one embodiment of a process for instructing an HMD to display physical objects that represent electronic communications.

FIG. 9 is a flowchart of one embodiment of a process 900 for instructing an HMD 2 to display physical objects that represent electronic communications. Process 900 is one embodiment of step 56 of FIG. 2. Any electronic device could perform process 900. In step 902, one or more images are generated for displaying physical objects in the HMD 2 that reflect the electronic communications. The following example will be used to illustrate. For the sake of illustration, the user has five new emails, two new voice mails, and three communications from a social networking website. The image might contain five envelopes (for emails), two telephones (for voice mails), and three post cards (for social networking communications). As another alternative, the image might contain an envelope with the numeral 5, a telephone with the numeral 2, a post card with the numeral 3. These examples of physical objects are for purposes of explanation, many other physical objects could be used. The physical objects can be arranged in any convenient way. For example, the envelopes might overlap to save space. It is also possible to simply show a stack of envelops without clearly showing how many are present.

In one embodiment, a single image is generated (e.g., still image) in step 902. In one embodiment, a video stream is generated. Any combination of still images and video streams may be generated in step 902. The video stream may allow the physical objects to change over time. For example, one of the telephones may appear to be ringing by appropriate movement. Instead of a video stream, a series of images may be generated in step 902. Note that a series of images may be different from a video stream in that a video stream may include a certain number of video frames that are to be presented each time interval (e.g. 30 frames per second). However, the series of images might not have any time component to them.

In step 904, the one or more images are provided to the HMD 2. For example, the server 48, cellular telephone 34a, or some other electronic device 34 provides the images to the HMD system 111 (by, for example, providing the images to the processing unit 4). In one embodiment, steps 902 and 904 are accomplished by the processing unit 4 generating images and providing the images to the HMD 2. In one embodiment, steps 902 and 904 are accomplished by the processing unit 4 and HMD 2 working together to generate images. Note that these images may be suitable as is for presentation on the HMD 2. Alternatively, the HMD 2 (and/or its processing unit 4) may perform further processing of the image in order to present it to the user. Also note that the one or more images could be delivered over a network 7. However, in some cases, a network 7 is not required. This concludes discussion of FIG. 9.

Figure 10:
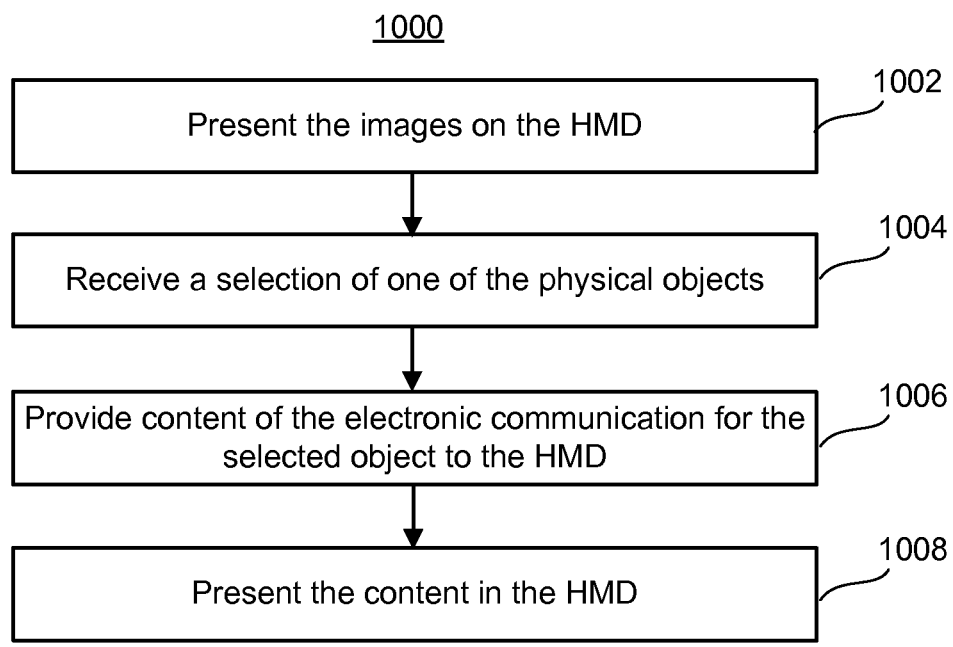
FIG. 10 is a flowchart of one embodiment of a process of presenting content of an electronic communication.

FIG. 10 is a flowchart of one embodiment of a process 1000 of presenting content of an electronic communication. Process 1000 may be performed after process 900 is used to provide the images to the HMD 2. Note that various steps of process 1000 could be performed by different devices.

In step 1002, the images are presented on the HMD 2. For example, the HMD 2 displays physical objects (e.g., envelopes, post cards, telephones, etc.) that represent the electronic communications.

In step 1004, a selection of one of the physical objects is received. The selection could be initiated in a variety of ways, such as a user 25 making a gesture, which may be recognized by computer vision. For example, a capture device 101 and computing system 12 may perform compute vision. Note that this selection may be passed along to any electronic device. For example, the server 48, the cellular telephone 34a, or some other electronic device can be informed that a selection of one of the physical objects has been made. Thus, the step of receiving a selection of one of the physical objects may be performed by any electronic device.

In step 1006, content of the electronic communication for the selected object is provided to the HMD 2. For example, if the user 25 selected an envelope (e.g., physical object) that represents an e-mail (e.g., electronic communication), then the content (e.g., text, graphics, etc.) of that e-mail may be sent to the HMD 2. Any electronic device may provide the content to the HMD 2.

In step 1008, the content is presented on the HMD 2. Note that presenting the content may include presenting audio and/or visual content. For example, text, graphics, images, or video could be displayed in the HMD 2. As another example, a voicemail may be played through an audio transducer. In some embodiments, the HMD 2 contains an audio transducer. However, the audio transducer may be connected to some other electronic device, such as a cellular telephone, computer, etc.

Note that in one embodiment, the content of an electronic communication is provided to the HMD system 111 after the user selects one of the physical objects. This is not the only option. In another embodiment, the content of the electronic communications are provided to the HMD system 111 with the images that contain the physical objects. For example, the server 48 or cellular telephone 34a may provide the processing unit 4 the content of the electronic communications (e.g. email text, voice-mail audio, etc.) before the user 25 selects any of the physical objects (e.g., envelopes, etc.).

Also note that some of the content of the electronic communications may be displayed with the physical objects before the user selects any of the physical objects. For example, one of the physical objects may be a post card. At least some of the content of the electronic communication may be displayed on that post card prior to the user selecting the post card. In this option, when the user selects the post card, additional content might be shown. For example, the post card might be made larger such that more text can be displayed. As another example, selecting the post card might cause an entirely new document to be displayed to allow additional text (or other content) to be presented. This concludes discussion of FIG. 10.

Figure 11:
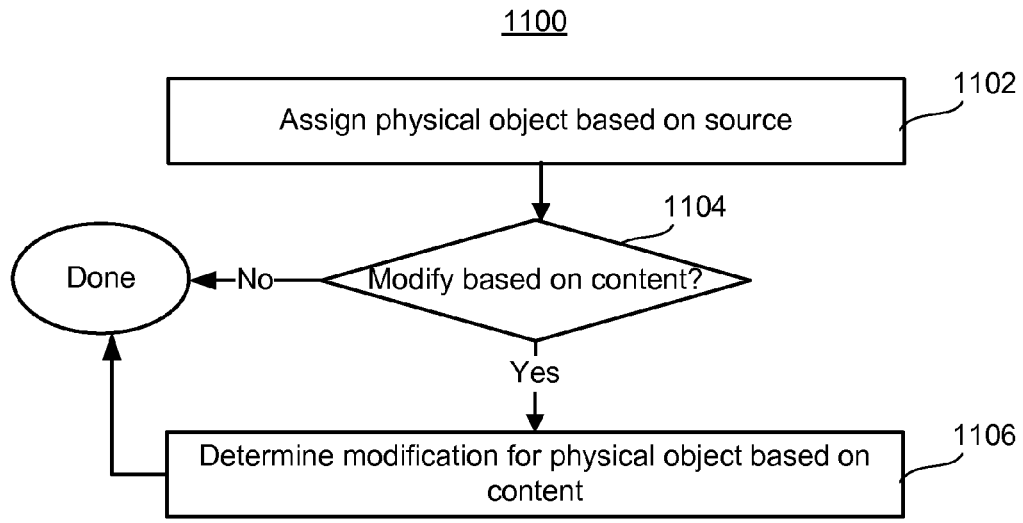
FIG. 11 is a flowchart of one embodiment of a process of determining what physical objects to present in the HMD.

FIG. 11 is a flowchart of one embodiment of a process 1100 of determining what physical objects to present in the HMD 2. Process 1100 is one embodiment of step 54 of FIG. 2. Process 1100 may be performed once for each electronic communication that is received, as one example. Any electronic device may perform process 1100.

In step 1102 a physical object is assigned to an electronic communication based on its source. For example, electronic communications that come from an e-mail source are assigned the physical representation of an envelope. Likewise, voicemails may be assigned the physical representation of a telephone, and text messages might be assigned the physical representation of a postcard.

In step 1104 a determination is made whether the content of the electronic communication should be used in determining how the physical object should appear. If not, then process 1100 may conclude. Otherwise, the physical object is modified based on the content in step 1106. For example, if the content of the electronic communication indicates that it is a birthday greeting, then it may be determined that the physical object should be a birthday card. Note that in this example, this might effectively override the source of the content. For example, a birthday card might be used regardless of whether this is an email, text message, social network communication, etc.

As another example, if the content of an e-mail indicates that it is high priority, then the envelope may be physically altered relative to other envelopes. Examples of physically altering include changing the color, size, shape, and adding motion (e.g., the contents may appear to be attempting to burst out of the envelope).

Note that process 1100 is just one way of determining how to assign a physical object to an electronic communication.

Many other techniques and variations could be used to assign physical objects to the electronic communications. This concludes discussion of FIG. 11.

Figure 12:
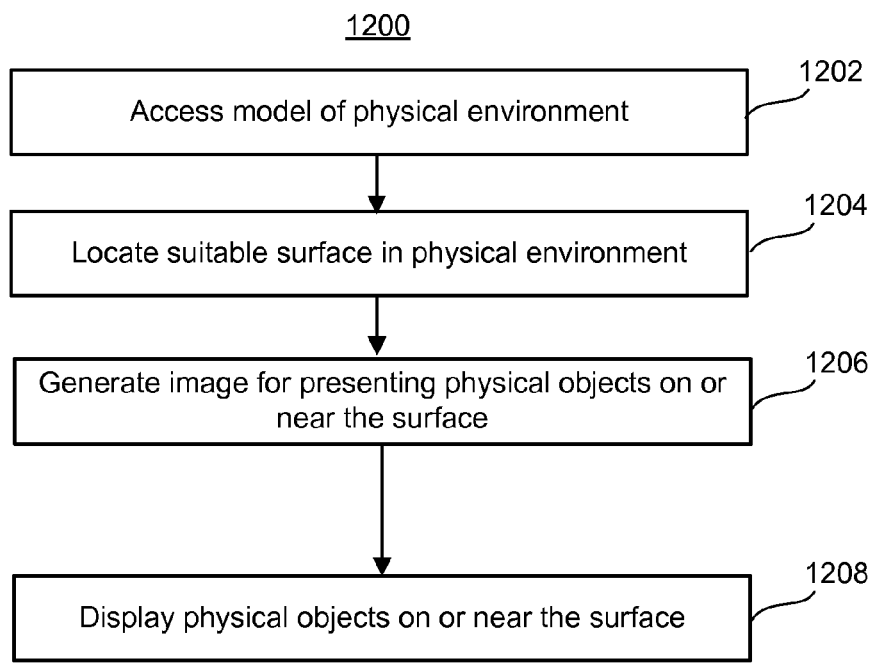
FIG. 12 is a flowchart of one embodiment of a process of determining an arrangement for physical objects to present in the HMD.

FIG. 12 is a flowchart of one embodiment of a process 1200 of generating an image for physical objects and presenting the image in the HMD 2. Steps 1202-1206 pertain to generating the image, and are one embodiment of step 54 of FIG. 2. Note that steps 1202-1206 are also one embodiment of step 902 of FIG. 9 (e.g., generating images for the physical objects). Steps 1202-1206 may be performed by any electronic device.

In step 1202, a model of the physical environment around the user is accessed. In one embodiment, a depth camera system (e.g., capture device 101 and computing system 12) provides this model to some other device, such as server 48 or cellular telephone 34a. In one embodiment, the depth camera system is used to generate a depth image of the environment. A depth image may be an array of depth pixels, with each depth pixel having a depth value. The depth image may be analyzed to generate a model of the environment. For example, the model may indicate 3D locations of various objects. In some cases object recognition may be used to estimate what the objects might be. For example, object recognition might be used to determine that an object is a person, a door, floor, wall, etc. Note that the model may also include a representation of the user.

Note that in some embodiments, the model for the physical environment is determined during some initial setup process. For example, the user might walk to different rooms in their home and allow the system to build a model for each room. The system might use GPS or some other means to link the model to a known coordinate. Then, when the user returns to, for example, their living room, the system only needs to determine that the user is at those coordinates and access the model that was previously constructed.

In step 1204, a suitable surface for displaying the objects on or around is determined. For example, the objects may be "registered" to a surface. Also note that the user's body may itself serve as the surface to which the objects should be registered. Note that the objects are not actually displayed on the surface, but may be made to appear as if they are on the surface. For example, some flat surface such as a table might be selected. In some embodiments, the selection is made without any input from a user. However, user input may be involved with the selection. For example, at some point in time the user might indicate what actual physical object in the environment should be used. This might occur during the previously mentioned process of building the room model, although that is not required.

In step 1206, one or more images for presenting the physical objects on the surface are generated. These images may be provided to the HMD 2.

In step 1208, the physical objects are displayed on the surface. That is, the HMD 2 makes it appear that the physical objects are on the surface. For example, the suitable use of 3D images, the HMD 2 may make it appear as though envelopes, post cards, etc. are sitting on a table in front of the user 25. Note that if the objects are registered to the user, the objects may follow the user. For example, the user may take email with them. In one embodiment, the user selects which objects to take with them. This concludes the discussion for FIG. 12.

Figure 13:
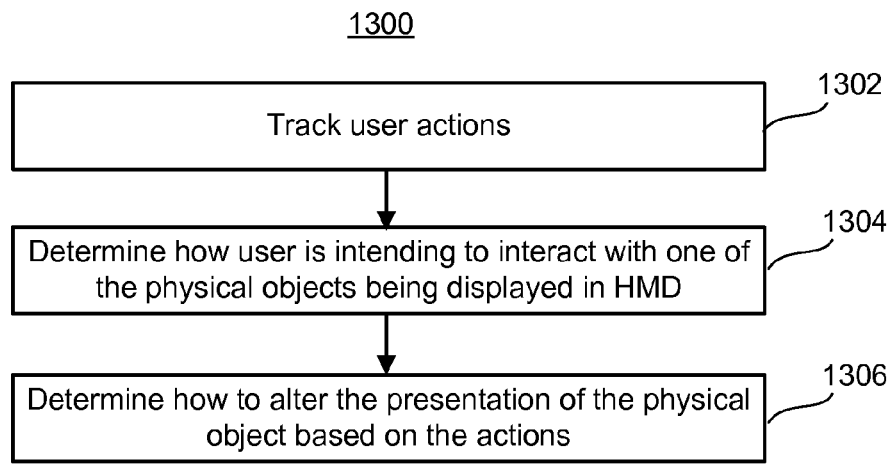
FIG. 13 is a flowchart that describes one embodiment of a process of allowing a user to interface with the physical object that represents an electronic communication.

FIG. 13 is a flowchart that describes one embodiment of a process 1300 of allowing a user to interact with the physical object that represents an electronic communication. For example, the process 1300 may be used to allow a user to "open" an envelope. This process 1300 may be performed at anytime that the physical objects are being presented on the HMD 2. Note that steps of process 1300 may be performed by any electronic device. For example, some of the steps that involve recognizing user actions might be performed by a capture device 101 and computing system 12 such as depicted in FIG. 7.

In step 1302, user actions are tracked. One or more devices could be used to collect and analyze data for tracking actions. As noted, a capture device 101 such as that depicted in FIGS. 1A-1C could be used. Also note that the HMD 2 may have a depth capture device for capturing the user's hand motions. Data from the depth capture device could be analyzed by the processing unit 4 or some other electronic device, such as a cellular telephone 34a, computer, etc.

In step 1304, a determination is made as to the user's intended interaction with the physical object being displayed in the HMD 2. For example, the positions and movements of the user's fingers may be tracked using computer vision to determine that the user is intending to open an envelope.

In step 1306, the physical object is altered in response to the user's actions. In the present example, the HMD display is changed to show the envelope being opened. Note that content of the electronic communication may be displayed in response to the user opening the envelope. This concludes discussion of FIG. 13.

Figure 14:
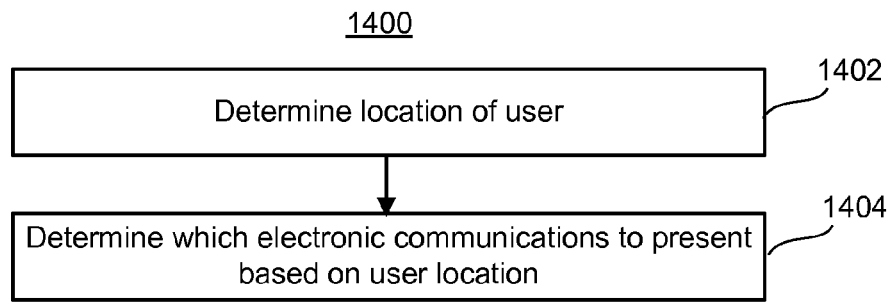
FIG. 14 is a flowchart that describes one embodiment of a process of determining which electronic communications should be represented in the HMD.

Note that it is not required that the user 25 be informed about all of the electronic communications at one time or place. For example, the user might prefer not to receive work e-mails at home. FIG. 14 is a flowchart that describes one embodiment of a process 1400 of determining which electronic communications should be represented in the HMD 2. Process 1400 may be used during step 54 to determine which electronic communications are in the subset for which physical objects are determined (see step 54, FIG. 2).

In step 1402, the location of the user 25 may be determined. As one example, the HMD may have a GPS in it to determine the user's position. Note that the user's privacy regarding their physical location may be maintained. For example, in embodiments in which all processing takes place on a local device, the location information may remain private. The user may also be asked to opt-in to having their physical location used. For example, for embodiments in which location data could possibly be transferred to a server 48, the user 25 could be asked to opt-in to having their location be transferred to the server 48.

Note that ultimately, the goal may be to determine what room, building, etc. that a user is in. Therefore, GPS or other information might be linked to rooms, etc. As one example, there might be a training period in which the user walks to different rooms, such that the system may link GPS or other location information to a room, building, etc.

Note that GPS or other location information is not required to determine what room, building the user is in. Another technique that might be used is to recognize the room using computer vision. For example, the system might train itself to recognize the user's living room, kitchen, office, etc. using computer vision techniques. Computer vision techniques are well known and will not be discussed further.

Still another way to determine the user's location may be to use some sort of beacon. For example, an electronic device that is known to be in the user's living room may emit such a beacon.

In step 1404, a determination is made as to which electronic communications should be represented in the HMD 2. As one example, if the user 25 is determined to be at the office (e.g., work), then work related communications might be selected for presentation. However, if the user is in their living room, then work related communications might be filtered out.

In one embodiment, the user 25 is allowed to specify the type and/or nature of electronic communications that should be presented at each location. In one embodiment, the system learns what types of electronic communications should be presented at each location. For example, the system learns that the user 25 consistently ignores certain electronic communications at home. As a specific example, the user may consistently ignore e-mails having certain sender address (such as work related addresses). Thus, the system determines that the user 25 does not wish to view these emails at home. For this learning option, the user 25 may be asked to opt-in to the system learning which electronic communications should be presented at each location. Therefore, the user's privacy may be preserved. This concludes discussion of FIG. 14.

Figure 15:
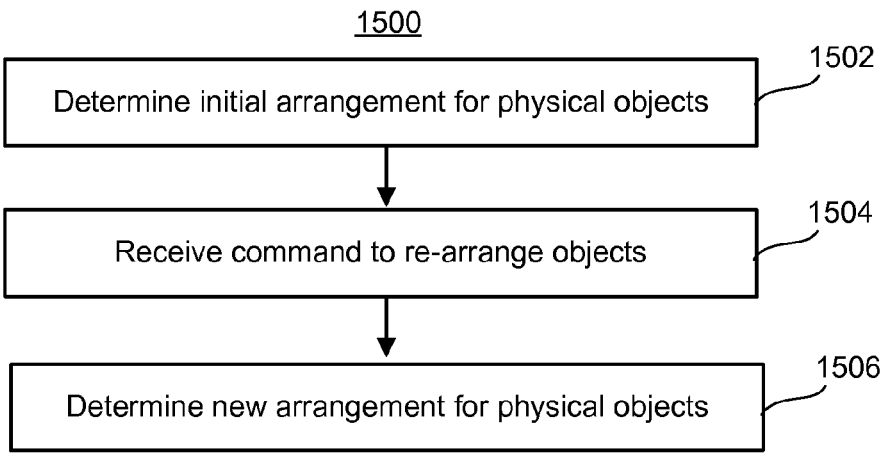
FIG. 15 is a flowchart that describes one embodiment of a process of sorting or indexing the physical objects.

In one embodiment, the user 25 is able to sort or index their electronic communications. That is to say, they can sort, index, or otherwise re-arrange the way in which the physical objects are presented in the HMD 2. This may greatly facilitate the user 25 going through their electronic communications. FIG. 15 is a flowchart that describes one embodiment of a process 1500 of sorting or indexing the physical objects. This process 1500 may be performed at any time that the physical objects are being presented in the HMD 2.

In step 1502, an initial arrangement is determined for the physical objects. That is, the way in which the physical objects should be presented in the HMD 2 may be determined. This step 1502 may be based on knowledge of the user's environment or without such knowledge. For example, it was previously mentioned that a model of the user's environment may be built or accessed. This model might contain geometric information for objects such as tables, walls, etc. Therefore, a suitable way to arrange the physical objects (e.g., envelopes, postcards, telephones, etc.) on a table may be determined. Note that different users may have their own preferences. For example, some users may prefer to see letters strewn about the table in a hap-hazard manner. Others may prefer a very ordered presentation. Regarding preferences, the system could ask the user for input or learn over time (assuming the user opts in to the learning mode).

In step 1504, a command to re-arrange the physical objects is received. This could be a command to sort or index, as examples. The command may be initiated by a user making a gesture; however, any other command input may be used. In one embodiment, the user selects a tab from a series of folders to initiate the sort. For example, the user's emails may originally be presented as a series of folders (the folders might overlap, such as one on top of another). To sort their emails, the user may select a tab from the series of folders that appear below an email on top of the folders. In one embodiment, the user "picks up" (or otherwise identifies through some gesture) one of the physical objects and issues a command to sort. For example, if the user wants to sort their emails, the user might pick up one of the emails and say "sort." Thus, the user may sort one type of electronic communication. The user may also sort multiple types of the electronic communications (e.g., emails, text messages, voicemails) using a single command. Any type of indexing or sorting might be requested. For example, the user could request sorting by time, priority, sender, etc.

In step 1506, a new arrangement for the physical objects is determined. As one example, all electronic communications having a high priority are made to stand out in some manner. This might include changing their location, as well as appearance. As a particular example, envelopes for high priority e-mails are placed on the top of a pile of envelopes. The envelope might also be visually highlighted by color, change in size, shape, etc.

Note that step 1506 is not limited to re-arranging the physical objects. Consider the example in which a user 25 has many electronic communications from the same person. In this case, a sticky note that says "more from sender" might be added to an envelope to indicate this. This concludes discussion of FIG. 15.

In some embodiments, one or more steps of any of the processes described herein may be performed by executing instructions on one or more processors. Processors may access instructions that are stored on a variety of computer readable media. Computer readable media can be any available media that can be accessed by the processor and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by processors. Combinations of the any of the above should also be included within the scope of computer readable media.

Figure 16:
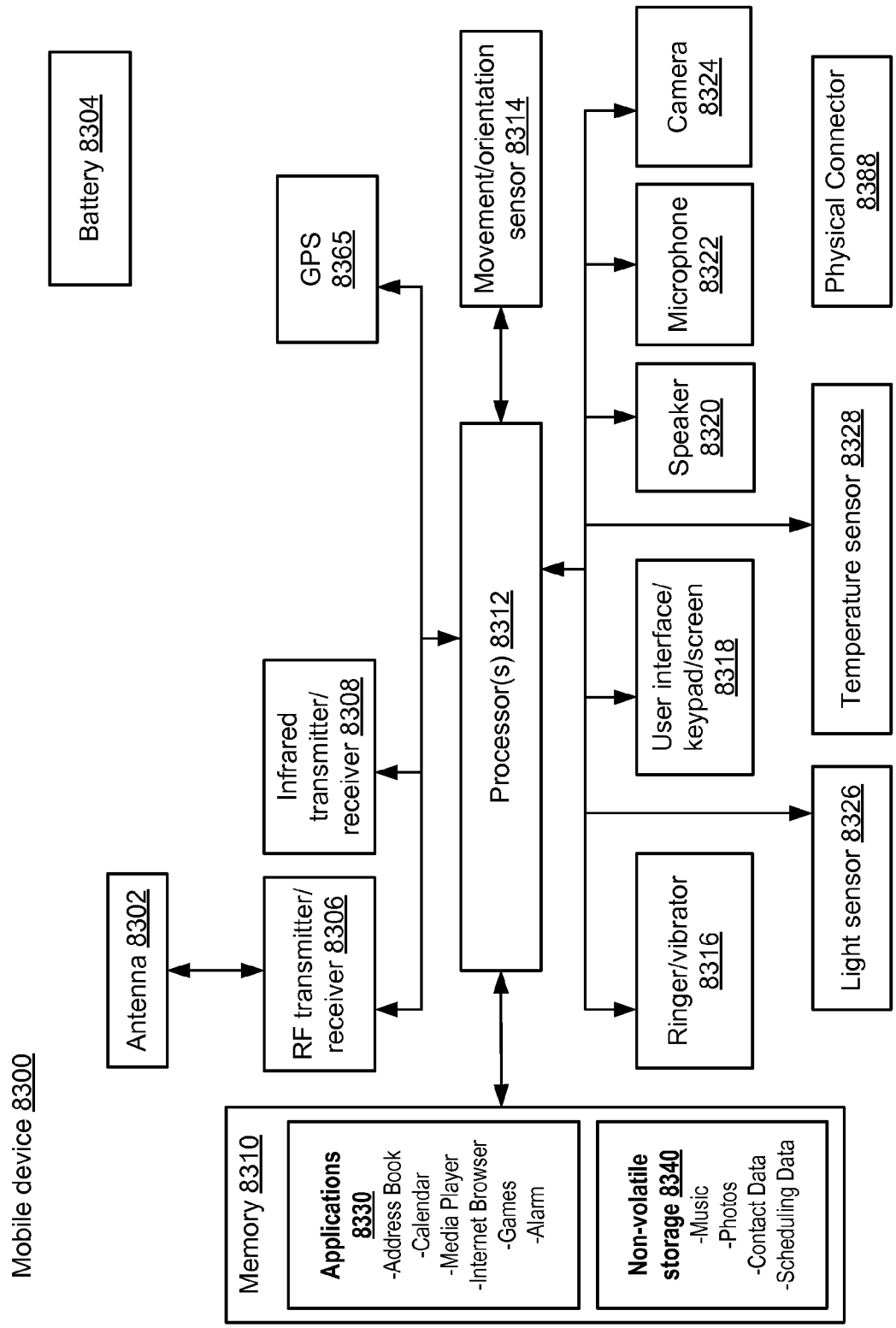
FIG. 16 is a block diagram of one embodiment of a mobile device.

FIG. 16 is a block diagram of one embodiment of a mobile device 8300. Mobile devices may include laptop computers, pocket computers, mobile phones, personal digital assistants, and handheld media devices that have been integrated with wireless receiver/transmitter technology. Mobile device 8300 may be used to implement cellular telephone 34*a* or other electronic devices 34.

Mobile device 8300 includes one or more processors 8312 and memory 8310. Memory 8310 includes applications 8330 and non-volatile storage 8340. Memory 8310 can be any variety of memory storage media types, including non-volatile and volatile memory. A mobile device operating system handles the different operations of the mobile device 8300 and may contain user interfaces for operations, such as placing and receiving phone calls, text messaging, checking voicemail, and the like. The applications 8330 can be any assortment of programs, such as a camera application for photos and/or videos, an address book, a calendar application, a media player, an internet browser, games, an alarm application, and other applications. One or more of the applications 8330 may be used to implement various processes disclosed in flowcharts herein. The non-volatile storage component 8340 in memory 8310 may contain data such as music, photos, contact data, scheduling data, and other files.

The one or more processors 8312 also communicates with RF transmitter/receiver 8306 which in turn is coupled to an antenna 8302, with infrared transmitter/receiver 8308, with global positioning service (GPS) receiver 8365, and with movement/orientation sensor 8314 which may include an accelerometer and/or magnetometer. RF transmitter/receiver 8308 may enable wireless communication via various wireless technology standards such as Bluetooth® or the IEEE 802.11 standards. Accelerometers have been incorporated into mobile devices to enable applications such as intelligent user interface applications that let users input commands through gestures, and orientation applications which can automatically change the display from portrait to landscape when the mobile device is rotated. An accelerometer can be provided, e.g., by a micro-electromechanical system (MEMS) which is a tiny mechanical device (of micrometer dimensions) built onto a semiconductor chip. Acceleration direction, as well as orientation, vibration, and shock can be sensed. The one or more processors 8312 further communicate with a ringer/vibrator 8316, a user interface keypad/screen 8318, a speaker 8320, a microphone 8322, a camera 8324, a light sensor 8326, and a temperature sensor 8328. The user interface keypad/screen may include a touch-sensitive screen display.

The one or more processors 8312 controls transmission and reception of wireless signals. During a transmission mode, the one or more processors 8312 provide voice signals from microphone 8322, or other data signals, to the RF transmitter/receiver 8306. The transmitter/receiver 8306 transmits the signals through the antenna 8302. The ringer/vibrator 8316 is used to signal an incoming call, text message, calendar reminder, alarm clock reminder, or other notification to the user. During a receiving mode, the RF transmitter/receiver 8306 receives a voice signal or data signal from a remote station through the antenna 8302. A received voice signal is provided to the speaker 8320 while other received data signals are processed appropriately.

Additionally, a physical connector 8388 may be used to connect the mobile device 8300 to an external power source, such as an AC adapter or powered docking station, in order to recharge battery 8304. The physical connector 8388 may also be used as a data connection to an external computing device. The data connection allows for operations such as synchronizing mobile device data with the computing data on another device.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method comprising:
    learning, by an electronic system, how a user interacted at a specific location with electronic communications from specific senders;
    accessing, by the electronic system, electronic communications that are addressed to the user, each of the electronic communications having a sender;
    determining, by the electronic system, a present location of the user, wherein the present location is the specific location;
    determining, by the electronic system based on the learning, a first subset of the electronic communications addressed to the user that are to be presented to the user at the present location and a second subset of the electronic communications addressed to the user that are not to be presented to the user at the present location;
    determining, by the electronic system, a plurality of physical objects that are representative of the first subset of the electronic communications;
    displaying the plurality of physical objects in a head mounted display (HMD), including displaying an image of the physical objects as being registered to a surface in the present location other than the user's body;
    receiving, by the electronic system while the image of the physical objects is being displayed as being registered to the surface in the present location, a selection of a first physical object of the plurality of physical objects whose image is to follow the user, wherein the first physical object corresponds to a first electronic communication in the first subset of the electronic communications;
    displaying, in the HMD, an image of the first physical object registered to the user's body in response to receiving the selection of the first physical object to follow the user; and
    continuing to display the image of the first physical object in the HMD as registered to the user's body after the user has left the present location.

2. The method of claim 1, further comprising:
    tracking actions of the user while the user is wearing the HMD and the HMD is displaying the image of the physical objects;
    determining how the user is intending to interact with the first physical object based on the actions; and
    determining how to alter presentation of the first physical object on the HMD based on the actions in order accomplish the user's intent to interact.

3. The method of claim 2, wherein:
    the tracking actions of the user wearing the HMD and the determining how the user is intending to interact include:
    tracking positions and movements of the user's fingers using computer vision to determine that the user is intending to open an envelope; and
    the determining how to alter presentation includes determining to show the envelope being opened.

4. The method of claim 1, wherein the determining a plurality of physical objects includes determining the first physical object based on a source of the first electronic communication.

5. The method of claim 1, further comprising:
    receiving a selection of the first physical object after the user has left the present location; and
    providing, by the electronic system, content of the first electronic communication to the HMD in response to the selection.

6. The method of claim 1, further comprising:
    determining, by the electronic system, an arrangement of the physical objects in response to a command to sort the electronic communications; and
    instructing, by the electronic system, the HMD to display the arrangement of the physical objects.

7. The method of claim 1, further comprising:
    determining content within the first electronic communication of the electronic communications; and
    determining the first physical object that is representative of the content of the first electronic communication.

8. The method of claim 1, further comprising:
    accessing, by the electronic system, a model of the present location; and
    determining, by the electronic system, an arrangement of the physical objects in the present location based on the model.

9. The method of claim 8, further comprising:
    learning, by the electronic system, preferences of the user for arranging the physical objects in the present location, wherein the electronic system determines the arrangement of the physical objects in the present location based on the learned user preferences.

10. The method of claim 8, wherein the arrangement is selected from a hap-hazard arrangement and an ordered arrangement.

11. The method of claim 1, wherein continuing to display the image of the first physical object in the HMD as registered to the user's body after the user has left the present location allows the user to take the first electronic communication with the user.

12. The method of claim 1, further comprising:
tracking, by the electronic system, actions of the user after the user has left the present location and the HMD is displaying the image of the first physical object registered to the user's body, wherein the actions include the user manipulating the image of the first physical object;
determining, by the electronic system, that the user is intending to open the first physical object; and
providing, by the electronic system, content of the first electronic communication to the HMD in response to determining that the user is intending to open the first physical object.

13. A system comprising:
a head mounted display (HMD);
a processor in communication with the HMD; and
computer storage media having instructions stored thereon which, when executed on the processor, cause the processor to perform the following:
learn how a user interacts at a specific location with electronic communications from specific senders;
access electronic communications that are addressed to the user, each of the electronic communications having a sender, each of the electronic communications is one of a plurality of types of communication;
determine a first subset of the electronic communications that are addressed to the user that are to be presented to the user at a present location based on the learning and a second subset of the electronic communications that are addressed to the user that are not to be presented to the user at the present location based on the learning;
determine a plurality of physical objects that are representative of the electronic communications in the first subset, each of the physical objects identifies the corresponding electronic communication as one the types of communication;
display an image of the plurality of physical objects in the HMD, the image makes it appear as if the plurality of physical objects are registered to a surface in the present location other than the user's body;
receive a selection of a first physical object of the plurality of physical objects whose image is to follow the user after the user has left the present location, wherein the first physical object corresponds to a first electronic communication in the first subset of the electronic communications;
display an image of the first physical object in the HMD registered to the user's body in response to receiving the selection of the first physical object to follow the user after the user has left the present location; and
continue to display the image of the first physical object in the HMD registered to the user's body after the user has left the present location.

14. The system of claim 13, wherein the system further includes an image capture device, and wherein the instructions further cause the processor to:
track actions of a user while the user is wearing the HMD based on a depth image from the image capture device;
determine how the user is intending to interact with the first physical object that corresponds to the first electronic communication based on the actions; and
determine how to alter presentation of the first physical object on the HMD based on the actions in order accomplish the user's intent to interact.

15. The system of claim 13, wherein the instructions further cause the processor to:
determine how to re-arrange the plurality of physical objects in response to a command to sort or index the plurality of physical objects; and
provide an updated image to the HMD to affect the re-arrangement of the plurality of physical objects.

16. Computer storage hardware having instructions stored thereon which, when executed on a processor, cause the processor to:
learn what type of electronic communication should be presented at a specific location based on a user's behavior with respect to various types of electronic communication at that specific location;
access electronic communications having content and that are addressed to the user, each of the electronic communications is one of a plurality of types of communication;
determine a present location of the user, wherein the present location is the specific location;
based on the learning, determine a first subset of the electronic communications addressed to the user that are to be presented to the user at the present location and a second subset of the electronic communications addressed to the user that are not to be presented to the user at the present location;
generate images for representing the first subset of the electronic communications as physical objects that are representative of the respective electronic communications;
provide the images to a head mounted display (HMD) that make it appear as if the physical objects are on a surface in the present location other than the user's body;
receive a first selection of a first physical object of the physical objects whose image is to follow the user, wherein the first physical object corresponds to a first electronic communication in the first subset of the electronic communications;
display an image of the first physical object in the HMD registered to the user's body in response to receiving the first selection of the first physical object to follow the user; and
continue to display the image of the first physical object in the HMD registered to the user's body after the user has left the present location;
receive a second selection of the first physical object after the user has left the present location; and
provide content of the first electronic communication to the HMD in response to the second selection.

17. The computer storage hardware of claim 16, wherein the instructions further cause the processor to:
track actions of the user while the user is wearing the HMD;
determine how the user is intending to interact with a second of the physical objects for a second of the electronic communications based on the actions;
update the images based on the actions; and
provide the updated images to the head mounted display (HMD).

18. The computer storage hardware of claim 16, wherein the instructions further cause the processor to:

receive a request to sort the electronic communications;
determine an arrangement for the physical objects to be displayed in the HMD in response to the request;
generate an additional image that contains the arrangement of the physical objects; and
provide the additional image to the HMD.

19. The computer storage hardware of claim 16, wherein the instructions that cause the processor to generate one or more images for representing the first subset of the electronic communications as physical objects that are representative of the electronic communications further cause the processor to:
determine how to render the first physical object in order to indicate a source of the first electronic communication.

20. The computer storage hardware of claim 16, wherein the instructions that cause the processor to learn further cause the processor:
learn that the user consistently ignores certain electronic communications at the specific location.

* * * * *